(12) United States Patent
Nelson et al.

(10) Patent No.: US 11,891,823 B2
(45) Date of Patent: Feb. 6, 2024

(54) EMERGENCY HOUSING UNIT

(71) Applicant: SNS Custom Containers, Bossier City, LA (US)

(72) Inventors: Eric Nelson, Bossier City, LA (US); Robert Shaver, Shreveport, LA (US); Jimmy Shockley, Shreveport, LA (US)

(73) Assignee: SNS Custom Containers, Bossier City, LA (US)

( * ) Notice: Subject to any disclaimer, the term of this patent is extended or adjusted under 35 U.S.C. 154(b) by 18 days.

(21) Appl. No.: 17/483,734

(22) Filed: Sep. 23, 2021

(65) Prior Publication Data
US 2022/0090399 A1    Mar. 24, 2022

Related U.S. Application Data

(60) Provisional application No. 63/082,161, filed on Sep. 23, 2020.

(51) Int. Cl.
| | |
|---|---|
| *E04H 1/12* | (2006.01) |
| *A62C 3/02* | (2006.01) |
| *A47K 4/00* | (2006.01) |
| *G08B 17/10* | (2006.01) |
| *H02S 20/22* | (2014.01) |
| *F24S 25/00* | (2018.01) |
| *G08B 7/06* | (2006.01) |

(52) U.S. Cl.
CPC ............ *E04H 1/1205* (2013.01); *A47K 4/00* (2013.01); *A62C 3/0292* (2013.01); *F24S 25/00* (2018.05); *G08B 7/06* (2013.01); *G08B 17/10* (2013.01); *H02S 20/22* (2014.12); *E04H 2001/1283* (2013.01)

(58) Field of Classification Search
CPC . E04H 1/1205; E04H 2001/1283; E04H 1/02; E04B 1/34321; E04B 2001/34389; E04B 1/3444
See application file for complete search history.

(56) References Cited

U.S. PATENT DOCUMENTS

| | | | | |
|---|---|---|---|---|
| 7,966,775 | B2 * | 6/2011 | Medley | E04B 1/3444 |
| | | | | 52/79.5 |
| 8,650,806 | B1 * | 2/2014 | Condie | E04H 1/1205 |
| | | | | 52/79.5 |
| 8,869,463 | B2 * | 10/2014 | Noiseux | E04H 1/1222 |
| | | | | 52/79.5 |
| 9,936,596 | B2 * | 4/2018 | Kamen | H05K 7/00 |
| 10,851,552 | B1 * | 12/2020 | DeMatteis | E04H 1/1205 |

(Continued)

*Primary Examiner* — Gisele D Ford
(74) *Attorney, Agent, or Firm* — Holoubek Patent Law, LLC; Charlotte Holoubek

(57) ABSTRACT

The presently disclosed invention relates to emergency housing units and methods of providing emergency shelter, where the emergency housing units comprising a shipping container, a front wall disposed at the front side having a door, a canopy pivotally connected to one of the shipping container and the front wall at a location adjacent to both a top portion of the shipping container and the front wall, the canopy able to pivot from a closed retracted position to an open extended position, and a canopy latch attached to the first gate and the second gate, the canopy latch engaging with the canopy and releasably lockably fixing the canopy and both gates in a fixed position relative to one another and preventing the gates from moving into a closed position.

7 Claims, 18 Drawing Sheets

(56) References Cited

U.S. PATENT DOCUMENTS

| | | | |
|---|---|---|---|
| 10,865,942 B2 * | 12/2020 | Banerjee | B65D 90/00 |
| 2010/0269419 A1 * | 10/2010 | Gyory | E04B 1/3483 |
| | | | 52/79.5 |
| 2013/0074424 A1 * | 3/2013 | Trascher | E04H 1/02 |
| | | | 52/79.5 |
| 2015/0354200 A1 * | 12/2015 | Leclerc | A47B 77/08 |
| | | | 52/745.02 |
| 2017/0222598 A1 * | 8/2017 | Campbell | E04B 1/34336 |
| 2021/0123237 A1 * | 4/2021 | Lang | E04C 2/12 |
| 2021/0317651 A1 * | 10/2021 | Clifton | E04H 1/1205 |

* cited by examiner

EMERGENCY HOUSING UNIT

CROSS REFERENCE TO RELATED APPLICATIONS/PRIORITY

The present invention claims priority to U.S. Provisional Patent Application No. 63/082,161, filed Sep. 23, 2020, which is incorporated by reference into the present disclosure as if fully restated herein. Any conflict between the incorporated material and the specific teachings of this disclosure shall be resolved in favor of the latter. Likewise, any conflict between an art-understood definition of a word or phrase and a definition of the word or phrase as specifically taught in this disclosure shall be resolved in favor of the latter.

BACKGROUND

Emergency housing is a pressing need when natural disaster strikes. Current solutions may require moving large numbers of people to new locations where permanent settlement are already in place, causing social dislocation to already traumatized individuals. Other current solutions may require carpenters to build wheelchair ramps for physically disabled disaster victims and electricians to connect power to new housing units. There is a need for a mobile, robust, easily deployable emergency housing unit.

SUMMARY

Wherefore, it is an object of the present invention to overcome the above-mentioned shortcomings and drawbacks associated with the current technology.

The following describes various illustrative and non-limiting embodiments of emergency housing units disclosed herein. The presently disclosed inventions include various combinations of the disclosed elements in the following text and figures, including the specific embodiments that are described. Limiting statements are to be read as applying to the described embodiment and not all embodiments unless explicitly stated.

The presently disclosed invention includes an option for temporary housing during disasters which is reusable after lengthy storage periods and is easily stored in large quantities. One embodiment has many of the amenities required of a small home, is made of steel, inside and outside, and is designed to be set-up and operational within minutes of delivery—as in times of emergency, minutes matter.

In many embodiments, the features were designed with storage of the emergency housing units in mind. The wheelchair access ramp and canopy collapse inward allowing the standard shipping container doors/gates to remain operational. The contents can be securely stored in an all steel container. The structural integrity has been maintained allowing the units to be stacked, minimizing the storage footprint required. Stacked three high, a football field could hold over a thousand units.

In one embodiment, the canopy serves multiple purposes. It acts a shelter from the elements and it securely locks to the container doors to prevent accidental closure when someone is in the home. The home tenant would have the key to the canopy lock.

In one embodiment, to close the emergency housing unit for storage the wheelchair ramp is raised and secured against the front wall. The canopy is unpinned and unlocked and lowered against the ramp. The front doors/gates then close as they would normally on a shipping container.

In one embodiment, the septic system is designed to incorporate a macerator that reduces sewage to a size that allows the internal pump to pump sewage and water to a remote holding site or handling facility. The macerator handles the flow from the shower, toilet, and two sinks. No sewage is stored within the unit. This enables the unit to have a system that pumps sewage through a 1" line instead of having to have a 3 or 4" gravity feed system.

In one embodiment, a standard 110V supply operates all the amenities within the unit. In a preferred embodiment, the air conditioning unit and the hot water heater tank can operate at the same time on a standard 110 volt supply, with a sufficiently low wattage air conditioning unit and/or a sufficiently low wattage hot water heater tank. In a further embodiment, a three-way switch can allow either the air conditioning or the hot water heater tank to operate. In further embodiments, an on-demand hot water heating system with propane heating may be used, to further reduce electrical consumption of the emergency housing unit.

Various advantages to various embodiments are a lockable, insulated, water tight, all steel design; quick set-up; wheelchair ramp and canopy being set up within minutes of arrival; canopy locks doors in the open position preventing accidental closure; sleeps four on two sets of bunks that have soy-based mattresses for improved fire rating compared to traditional mattresses; one or both upper bunks fold down to form the back of a couch; fold up metal table allows extra space for a fifth cot if required for additional bed space; two stainless steel sinks and stainless-steel counter tops; LED lighting in main living area and bathroom reduces electricity consumption and heat generation while allowing sufficient illumination; polished stainless-steel mirror will not break; exterior roof painted with Kool Coat™ type paint cools the unit reducing load on A/C; electrical system is GFI protected, wall mounted and enclosed in conduct with metal faceplates; the unit is vented to the outside; air is drawn in by the A/C system and exits the 6" duct located next to the front door, these same vents help the unit "breath" when being stored, and, in further embodiments, the unit could be made as negative pressure and used for quarantine purposes; being all metal the unit can be sanitized after each use and before storage; an emergency housing option that is better, safer, has a long live span, and an option that can be easily stored; substantially keeping the structural integrity of the container intact, with many embodiments of the emergency housing units being stronger than the shipping containers they are built from; the emergency housing units being stackable, as they would be on a ship.

In some embodiments the entrance is unique in that it provides a safe environment for the residents, yet can be quickly, and easily, deployed. The entrance front wall is offset just enough to allow the wheel chair ramp and canopy to fold in yet giving the maximum amount of living space. Both the canopy and ramp are hinged allowing them to be folded inward for storage. When folded in the shipping container doors/gates close as per a standard shipping container's doors/gates. When the emergency housing units are deployed, the shipping container doors/gates are opened, the canopy elevated and locked into position, and the ramp lowered. The canopy has two main functions. First, it extends the living area slightly and protects the resident from the elements while entering or leaving. Second, when locked into position, it prevents the container doors from being closed while someone is in the home. A ramp latch is present to hold the wheelchair ramp up when shutting down the home. It makes it an easier and safer process. Raise the ramp, secured in position and then lower the canopy to store, and the reverse to set up. It is easily a one-man job. By reducing the labor required to set up the emergency housing unit, the speed of set up is dramatically decreased, and, conversely, the number of lives saved in a potential disaster is increased.

The presently disclosed invention relates to methods of emergency housing individuals and emergency housing units comprising a shipping container having a base, a top wall, first side wall, a second side wall, a rear wall, and a first gate and a second gate along a front side opposite the rear wall, a front wall disposed at the front side having a door, a canopy pivotally connected to one of the shipping container and the front wall at a location adjacent to both a top portion of the shipping container and the front wall, the canopy able to pivot from a closed retracted position parallel with the front wall to an open extended position, a canopy latch attached to one of the first gate, the second gate, and both the first gate and the second gate, the canopy latch engaging with the canopy and releasably lockably fixing the canopy and one or both gates in a fixed position relative to one another and releasably lockably holding the canopy in an open extended position and preventing the gates from moving into a closed position. According to a further embodiment, the extended position of the canopy is between 100 degrees and 92 degrees or between 88 degrees and 80 degrees with respect to the front wall. According to a further embodiment, the emergency housing comprises a ramp that is pivotally connected to one of the shipping container and the front wall at a location adjacent to both a bottom portion of the shipping container and the front wall, and is able to pivot from a folded position adjacent and parallel to the front wall, and a deployed position extending downwardly sloping from the front wall. According to a further embodiment, the emergency housing comprises a ramp latch attached to one of the ramp and the front wall that releasably attaches the ramp in the folded position. According to a further embodiment, the emergency housing comprises a toilet, a macerator, and a first waste conduit conducting waste from the toilet to the macerator. According to a further embodiment, the emergency housing comprises a shower and a second waste conduit, the second waste conduit conducting grey water from the shower to the to the macerator. According to a further embodiment, the emergency housing comprises one of a kitchen sink, a wash sink, and both a kitchen sink and a wash sink, and one of a third waste conduit, a fourth waste conduit, and both a third waste conduit and a fourth waste conduit, whereby the third waste conduit conducts grey water from the kitchen sink to the to the macerator, and the fourth waste conduit conducts grey water from the wash sink to the to the macerator. According to a further embodiment, the emergency housing comprises a plurality of through hole conduits in one of the first side wall, the second side wall, the rear wall and the base, the plurality of through hole conduits including one or more or all of an electric feed, a water feed, a septic discharge, and a septic vent, electrical wiring with multiple electrical outlets to deliver electricity to the from the electric feed through emergency housing unit, clean water piping fluidly connecting one of a kitchen sink, a wash sink, a toilet, and a shower to the water feed, waste conduits fluidly connecting the one or more or all of the kitchen sink, the wash sink, a toilet, and the shower to a macerator, and then to the septic discharge, and septic vent piping fluidly connecting the macerator and the septic vent. According to a further embodiment, each of the plurality of through hole conduits is located within 18 inches of any of any of the other plurality of through hole conduits. According to a further embodiment, the emergency housing comprises one or more ventilation openings defined in one of the first side wall, the second side wall, the rear wall, and the front wall at a location adjacent to the top wall. According to a further embodiment, the emergency housing comprises one of a fire sensor and a smoke sensor mounted on one of the first side wall, the second side wall, the rear wall, the front wall, and the top wall, an ADA alert alarm communicatively connected to the one of the fire sensor and the smoke sensor, the ADA alert alarm adapted to discharge one of a visual and an auditory alarm when alerted to a fire from the one of the fire sensor and the smoke sensor, and a sprayer fluidly connected to a fire-retardant reservoir, the sprayer having a sprayer sensor that senses one of heat and smoke and being configured to spray fire retardant in an interior of the emergency housing unit, the fire retardant being one of water and a non-water chemical fire retardant, and the fire-retardant reservoir being one of a clean water source through a main pipe and a pressurized non-main pipe fire retardant reservoir. According to a further embodiment, the emergency housing comprises a first bunk bed attached to one of the first wall and the second wall and a second bunk bed pivotally attached to the one of the first wall and the second wall vertically above the first bunk bed, the second bunk bed releasably fixedly positionable in a first position, substantially parallel to the base, and a second position substantially orthogonal to the base, a frame of the second bed extending from the one of the first wall and second wall in the first position substantially a same distance as the second bed is vertically above the first bed, such that when the second bed is pivoted into the second position, the first bed and the second bed form a couch. According to a further embodiment, the emergency housing comprises the canopy in the extended position being between 110 degrees and 92 degrees or between 87 degrees and 70 degrees with respect to the front wall, further comprising a ramp that is pivotally connected to one of the shipping container and the front wall at a location adjacent to both a bottom portion of the shipping container and the front wall, and is able to pivot from a folded position adjacent and parallel to the front wall, and a deployed position extending downwardly sloping from the front wall, a ramp latch attached to one of the ramp and the front wall that releasably attaches the ramp in the folded position, a toilet, a macerator, a first waste conduit conducting waste from the toilet to the macerator, a shower, a kitchen sink, a wash sink, a second waste conduit fluidly connecting the shower to the to the macerator, a third waste conduit fluidly connecting the kitchen sink to the to the macerator, a fourth waste conduit fluidly connecting the wash sink to the to the macerator, a plurality of through hole conduits in one of the first side wall, the second side wall, the rear wall and the base, the plurality of through hole conduits including an electric feed, a water feed, a septic discharge, and a septic vent, and each of the plurality of through hole conduits being located within 18 inches of any of any of the other plurality of through hole conduits, electrical wiring with multiple electrical outlets to deliver electricity to the from the electric feed through emergency housing unit, clean water piping fluidly connecting each of a kitchen sink, a wash sink, a toilet, a shower, and a sprayer to the water feed, waste conduits fluidly connecting the one or more or all of the kitchen sink, the wash sink, a toilet, and the shower to a macerator, and then to the septic discharge, septic vent piping fluidly connecting the macerator and the septic vent, one or more ventilation openings defined in one of the first side wall, the second side wall, the rear wall, and the front wall at a location adjacent to the top wall, one of a fire sensor and a smoke sensor mounted on one of the first side wall, the second side wall, the rear wall, and the front wall, a visual and/or auditory ADA alert alarm communicatively connected to the one of the fire sensor and the smoke sensor, the sprayer adapted to spray water when a sprayer heat sensor detects fire, a first bunk bed attached to one of the first wall and the second wall and a second bunk bed pivotally attached to the one of the first wall and the second wall vertically above the first bunk bed, the second bunk bed releasably fixedly positionable in a first position, substantially parallel to the base, and a second position substantially orthogonal to the base, a frame of the second bed extending from the one of the first wall and second wall in the first position substantially a same distance as the second bed is vertically above the first bed, such that when the second bed is pivoted into the second position, the first bed and the second bed form a couch, a solid polished steel mirror attached to one of the first side wall, the back wall, and the second side wall, a portable air-conditioner inside the house with an air conditioner vent defined in the first wall, one of a solar thermal collector, a photovoltaic array, and both a solar thermal collector and a photovoltaic array arranged on an exterior surface of one of the shipping container, a plurality of light emitting diode lights attached to an upper portion of the inside of the house.

The presently disclosed invention further comprises methods of housing individuals in an emergency and emergency housing settlements comprising a first plurality of emergency housing units, each housing unit including a shipping container having a base, a top wall, first side wall, a second side wall, a rear wall, and a first gate and a second gate along a front side opposite the rear wall, a front wall disposed at the front side having a door, a canopy pivotally connected to one of the shipping container and the front wall at a location adjacent to both a top portion of the shipping container and the front wall, the canopy able to pivot from a closed retracted position parallel with the front wall to an open extended position; and a canopy latch attached to one of the first gate, the second gate, and both the first gate and the second gate, the canopy latch engaging with the canopy and releasably lockably fixing the canopy and one or both gates in a fixed position relative to one another and releasably lockably holding the canopy in an open extended position and preventing the gates from moving into a closed position, a water source, an electrical power source, a drainage collection unit, a main pipe connected to the water source and routing water toward the plurality of emergency housing units, a power line routing electrical power from the electrical power source toward the emergency housing units, and a primary drainage conduit routing waste from the plurality of emergency housing units to the drainage collection unit. According to a further embodiment, the emergency housing settlement comprises a first housing colony including the first plurality of emergency housing units of and a second housing colony including a second plurality of emergency housing units. According to a further embodiment, the first plurality of plurality of emergency housing units includes a first row of emergency housing units and a second row of emergency housing units, with a rear of the first row of emergency housing units faces and is spaced from a rear of the second row of emergency housing units, creating a street between the respective first and second rows. According to a further embodiment, the main pipe runs down the street at ground level, and a respective one of a plurality of auxiliary pipes connects each emergency housing unit to the main pipe. According to a further embodiment, the primary drainage conduit runs down the street at an elevation above a height of one or more or all of a plurality of auxiliary drainage conduits, and a respective one of the plurality of auxiliary drainage conduits connects each emergency housing unit to the primary drainage conduit.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that while the accompanying drawings are to scale for one or more embodiments of the presently disclosed invention, the emphasis is placed on illustrating the principles of the invention. The invention will now be described, by way of example, with reference to the accompanying drawings in which.

DETAILED DESCRIPTION

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 4:
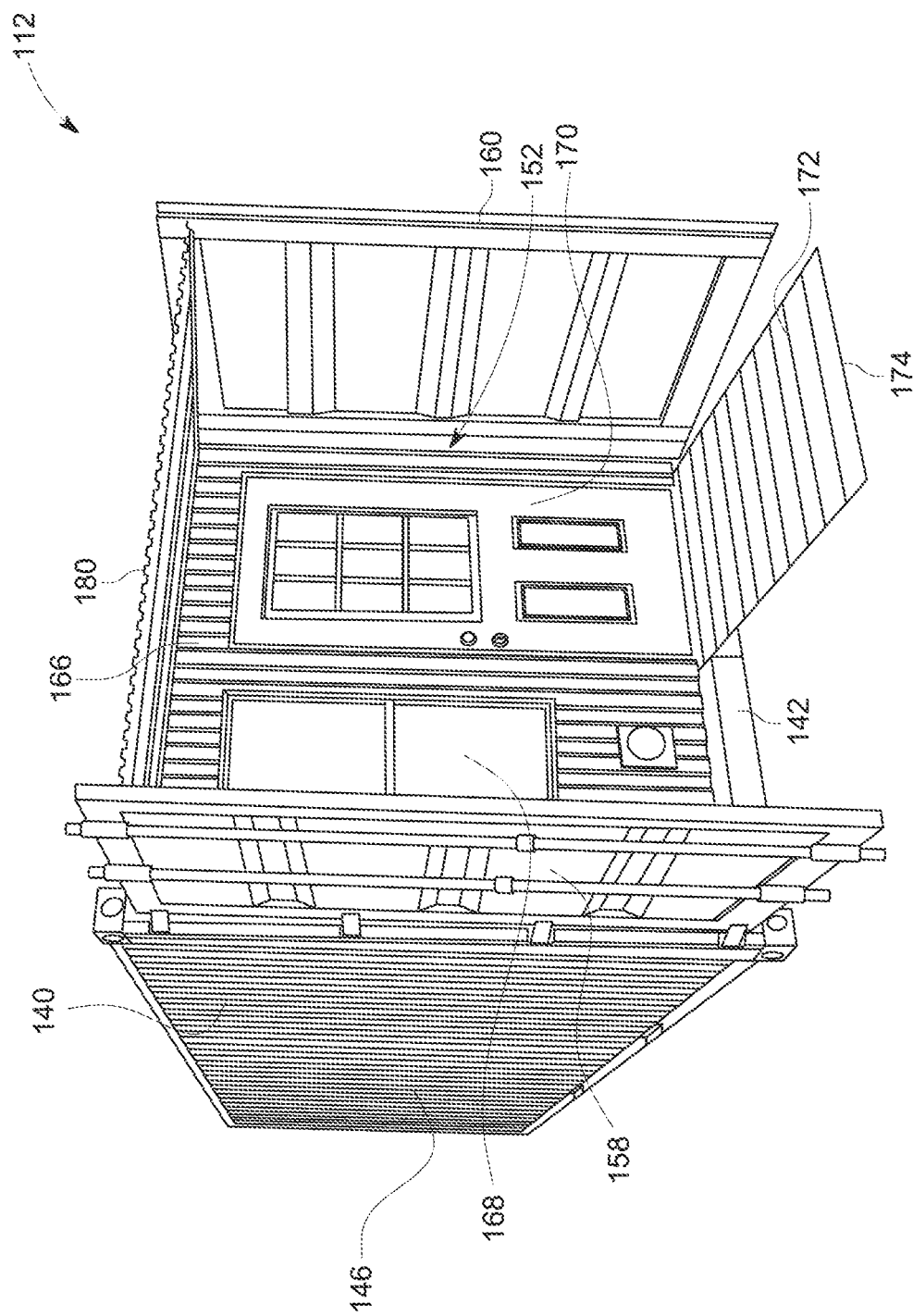
FIG. 4 is a side perspective view of a single emergency housing unit of the emergency housing settlement of FIG. 1, in accordance with an embodiment of the disclosure.
Figure 5:
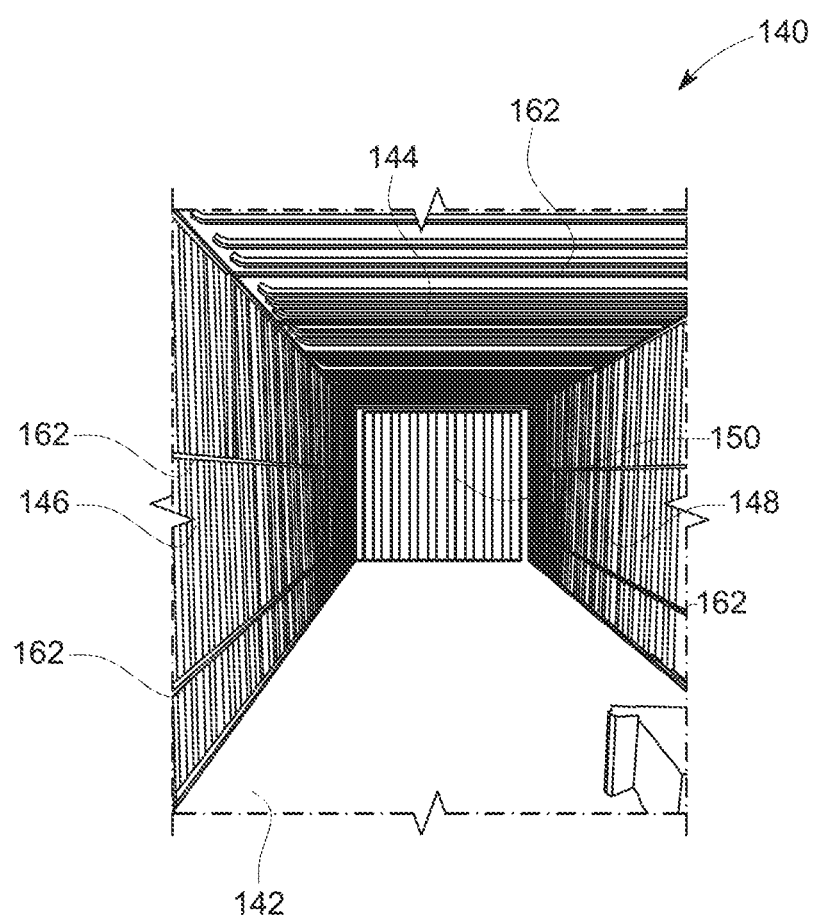
FIG. 5 is a front view of an empty shipping container prior to conversion to the emergency housing unit of FIG. 4, in accordance with an embodiment of the disclosure.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm. The embodiments set forth the below represent the necessary information to enable those skilled in the art to practice the invention and illustrate the best mode of practicing the invention. In addition, the invention does not require that all the advantageous features and all the advantages need to be incorporated into every embodiment of the invention. The description below describes one or more of many embodiments of the present invention, and unless elements are described as mandatory, each should be considered an optional element of one or more embodiments of the present invention and not a mandatory element of all embodiments. Directions up, down, left, right, above, below, rear, front, are as depicted in FIGS. 4 and 5.

The embodiments set forth the below represent the necessary information to enable those skilled in the art to practice the invention and illustrate the best mode of practicing the invention. For the measurements listed, embodiments including measurements plus or minus the measurement times 5%, 10%, 20%, 50% and 75% are also contemplated. For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "substantially" means that the property is within 80% of its desired value. In other embodiments, "substantially" means that the property is within 90% of its desired value. In other embodiments, "substantially" means that the property is within 95% of its desired value. In other embodiments, "substantially" means that the property is within 99% of its desired value. For example, the term "substantially complete" means that a process is at least 80% complete, for example. In other embodiments, the term "substantially complete" means that a process is at least 90% complete, for example. In other embodiments, the term "substantially complete" means that a process is at least 95% complete, for example. In other embodiments, the term "substantially complete" means that a process is at least 99% complete, for example.

The term "substantially" includes a value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

The term "about" includes when value is within about 10% of the indicated value. In certain embodiments, the value is within about 5% of the indicated value. In certain embodiments, the value is within about 2.5% of the indicated value. In certain embodiments, the value is within about 1% of the indicated value. In certain embodiments, the value is within about 0.5% of the indicated value.

In addition, the invention does not require that all the advantageous features and all the advantages of any of the embodiments need to be incorporated into every embodiment of the invention.

Figure 1:
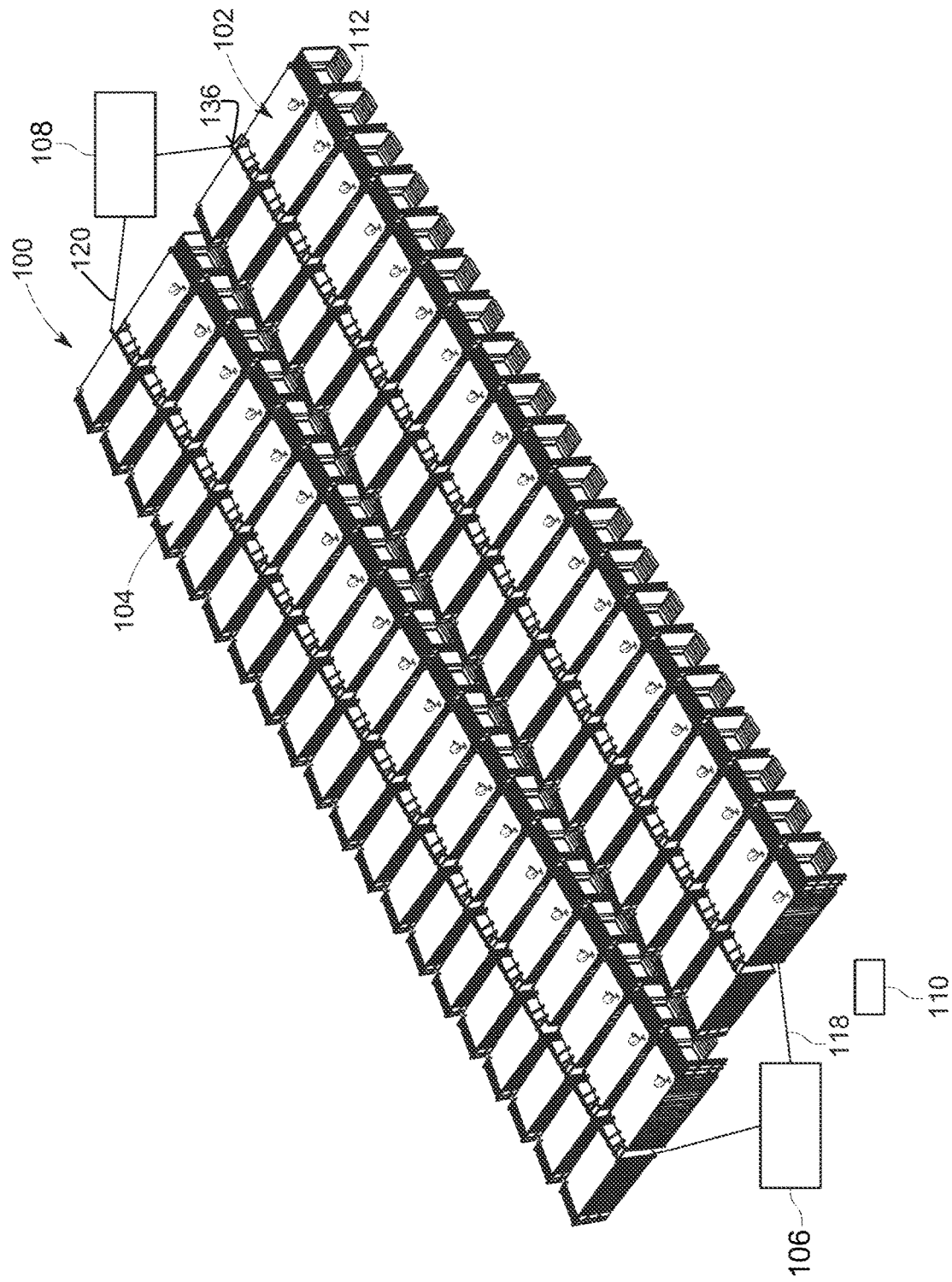
FIG. 1 is a schematic view of an emergency housing settlement having a plurality of housing colonies, in accordance with an embodiment of the disclosure.

Turning now to FIG. 1, a brief description concerning the various components of the present invention will now be briefly discussed.

Reference will be made to the figures, showing various embodiments of a emergency housing unit and a housing settlement having a plurality of emergency housing units.

Figure 2:
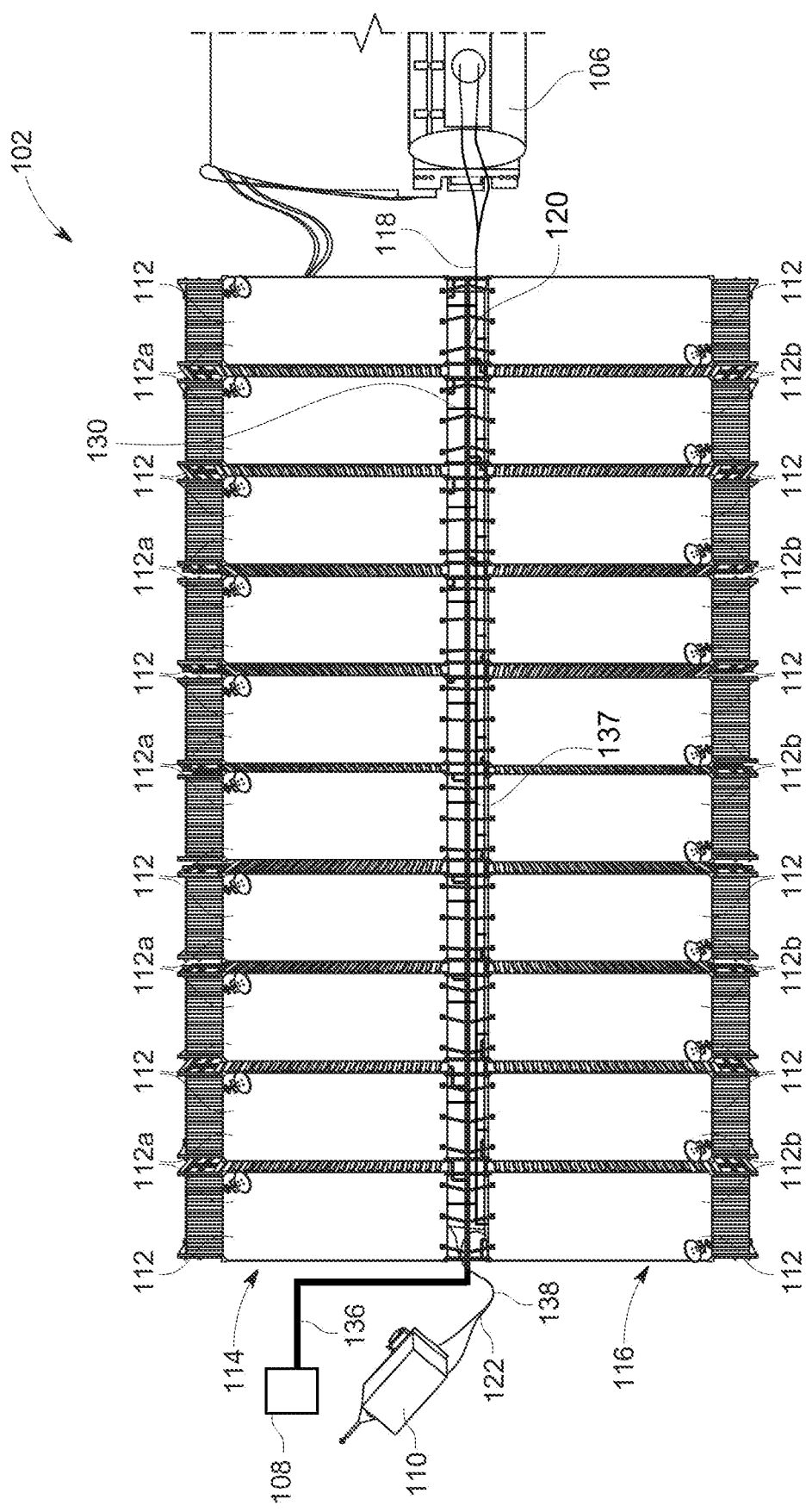
FIG. 2 is a schematic view of a first housing colony of the housing settlement of FIG. 1, having a plurality of emergency housing units, in accordance with an embodiment of the disclosure.

Referring to FIG. 1, a schematic view of an emergency housing settlement 100 (also referred to as a settlement 100) is shown. The settlement 100 preferably has a plurality of housing colonies, for example, a first housing colony 102 and a second housing colony 104, a water reservoir or water source 106, including a water tank, water tanker truck, well water, and municipal water, a drainage collection unit or drainage tank 108, such as a septic tank, a septic tank truck, or municipal sewage, for example, and an electrical power source 110, such as one or more electric generators, photovoltaic panels, wind powered electric generators, and the electric power grid. The first housing colony 102 is identical to the second housing colony 104, and for the sake of clarity and brevity, only the first housing colony 102, simply referred to as housing colony 102, is explained. Referring to FIG. 2, the housing colony 102 includes a plurality of emergency housing units 112 (also referred to as houses 112) arranged in a pair of rows, for example, a first row 114 and a second row 116 arranged substantially parallel to each other, a water delivery system 118, a drainage system 120 (shown in FIG. 1), and a power supply system 122. As shown, emergency housing units 112a of the first row 114 and emergency housing units 112b of the second row 116 are arranged such that rears of emergency housing units 112a of the first row 114 are disposed facing rears of the emergency housing units 112b of the second row 116.

The water delivery system 118 preferably includes at least one main pipe 130 extending along a street 132 defined between rears of the emergency housing units 112a of the first row 114 and the rears of the emergency housing units 112b of the second row 116, and enables a flow of water from the water reservoir 106 to the emergency housing units 112. As shown, the water delivery system 118 preferably includes a plurality of auxiliary pipes 134 connected to the main pipe 130 to provide the water to each emergency housing unit 112 of the two rows 114, 116. As shown, a single emergency housing unit 112 receives the water from the main pipe 130 via a single auxiliary pipe 134. In the embodiment shown, water is handled at ground level, with main pipe 130 running along the ground. Water is supplied by a pressurized water supply. A single main pipe 130 can feed water to the entire housing colony 102, with auxiliary pipes 134 feeding individual emergency housing units 112. When the water enters the emergency housing unit 112, part of the flow is split and directed to a hot water heater and tank 200.

Figure 3:
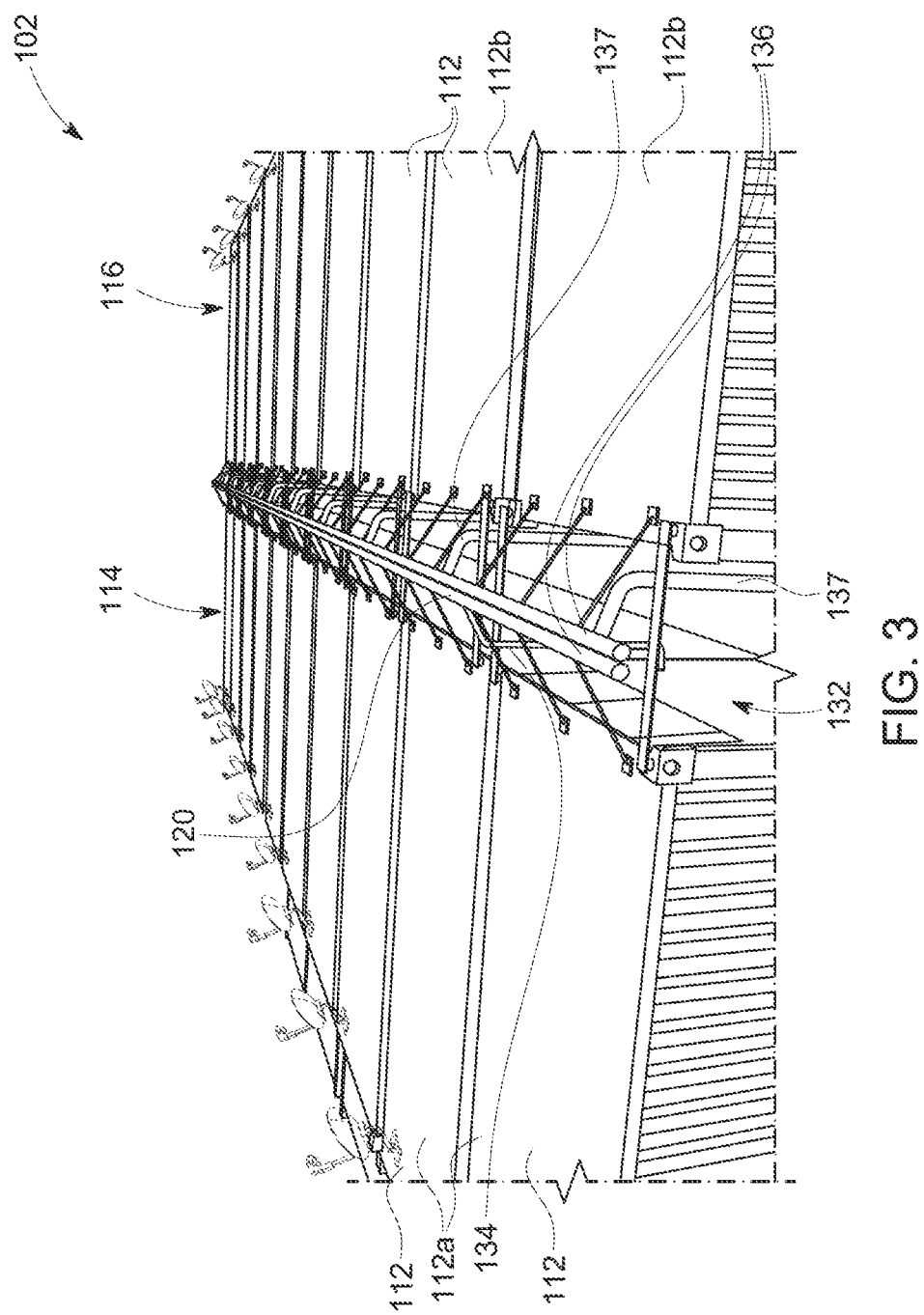
FIG. 3 is top view of a portion of the first housing colony as shown in FIG. 2, in accordance with an embodiment of the disclosure.

Similar, to the water delivery system 118, as shown in FIG. 3 the drainage system 120 is adapted to facilitate a drainage of a waste from each emergency housing unit 112 of two rows 114, 116 to a drainage collection unit, for example, the drainage tank 108, and includes a primary drainage conduit 136, and a plurality of the secondary drainage conduits 137. The secondary drainage conduits 137 facilitate the flow of waste from each emergency housing unit 112 to the primary drainage conduit 136. Accordingly, the waste from a single emergency housing unit 112 is provide to the primary drainage conduit 136 via a single secondary drainage conduit. The primary drainage conduit 136 extends along the length of the street 132 and enables a flow of the waste to the drainage tank 108. In the embodiment shown, all the piping mounted above the units 112 are for waste removal. The macerator 198 (described below) has the ability to pump up to 25 vertical feet, for example. The waste is pumped through a check valve 199 (shown in FIG. 18) preventing back flow, to the piping located above the units 112 where it is allowed to gravity feed to a holding tank 108 or a disposal system.

Moreover, the power supply system 122 preferably has a plurality of power lines 138 for supplying electricity to the emergency housing units 112 from the electric power source 110.

Referring to FIG. 4, a side perspective view of the emergency housing unit 112 is shown. The emergency housing unit 112 is includes a shipping container 140 converted to become an emergency housing unit 112. The shipping container 140 is preferably constructed of steel and measures 8 feet wide, 20, 30 or 40 feet in length, and 8 feet, 8.5 feet, 9 feet, and 9.5 feet tall. The shipping containers 140 have castings with openings for twistlock fasteners at each of the eight corners, to allow gripping the box from above, below, or the side. The shipping containers 140 are preferably constructed of corrugated weathering steel (e.g., Cor-Ten™). The embodiment shown in the figures measures 8 feet wide, 8.5 feet tall, and 20 feet in length, such that, stacked three high, approximately 1000 emergency housing units 112 may fit in a footprint the size of a football field.

Referring to FIG. 5, a mid-conversion empty shipping container 140 is shown. As shown, the shipping container 140 has a preferably 2 inch thick base 142, a top wall 144, a first sidewall 146 defining a first longitudinal side of the shipping container 140, a second sidewall 148 arranged substantially parallel to the first sidewall 146, and a rear wall 150 extending between the first sidewall 146 and the second sidewall 148. As shown, the rear wall 150 is arranged along a lateral side of the shipping container 140. It may be appreciated that a length of the shipping container 140 is greater than a width and a height of the shipping container 140. Further, the two sidewalls 146, 148 define an access opening 152 therebetween at a front end of the shipping container 140 to facilitate an access to an interior of the emergency housing unit 112. Additionally, the shipping container 140 includes a pair of gates (shown in FIGS. 4, 6 and 7), for example, a first gate 158 and a second gate 160, adapted to move between a closed first position and an open second position. In the first position, the gates 158, 160 cover the access opening 152 and facilitates a transportation of the emergency housing unit 112, while the gates 158, 160 provide access to the interior of the emergency housing unit 112 through the access opening 152 when arranged at the second position (shown in FIGS. 4 and 6). As exemplified in FIG. 7, the first gate 158 is shown in the first position, covering a portion of the access opening 152. Also, as shown, the first gate 158 is pivotally attached to the first sidewall 146 and the second gate 160 is pivotally attached to the second sidewall 148.

Figure 6:
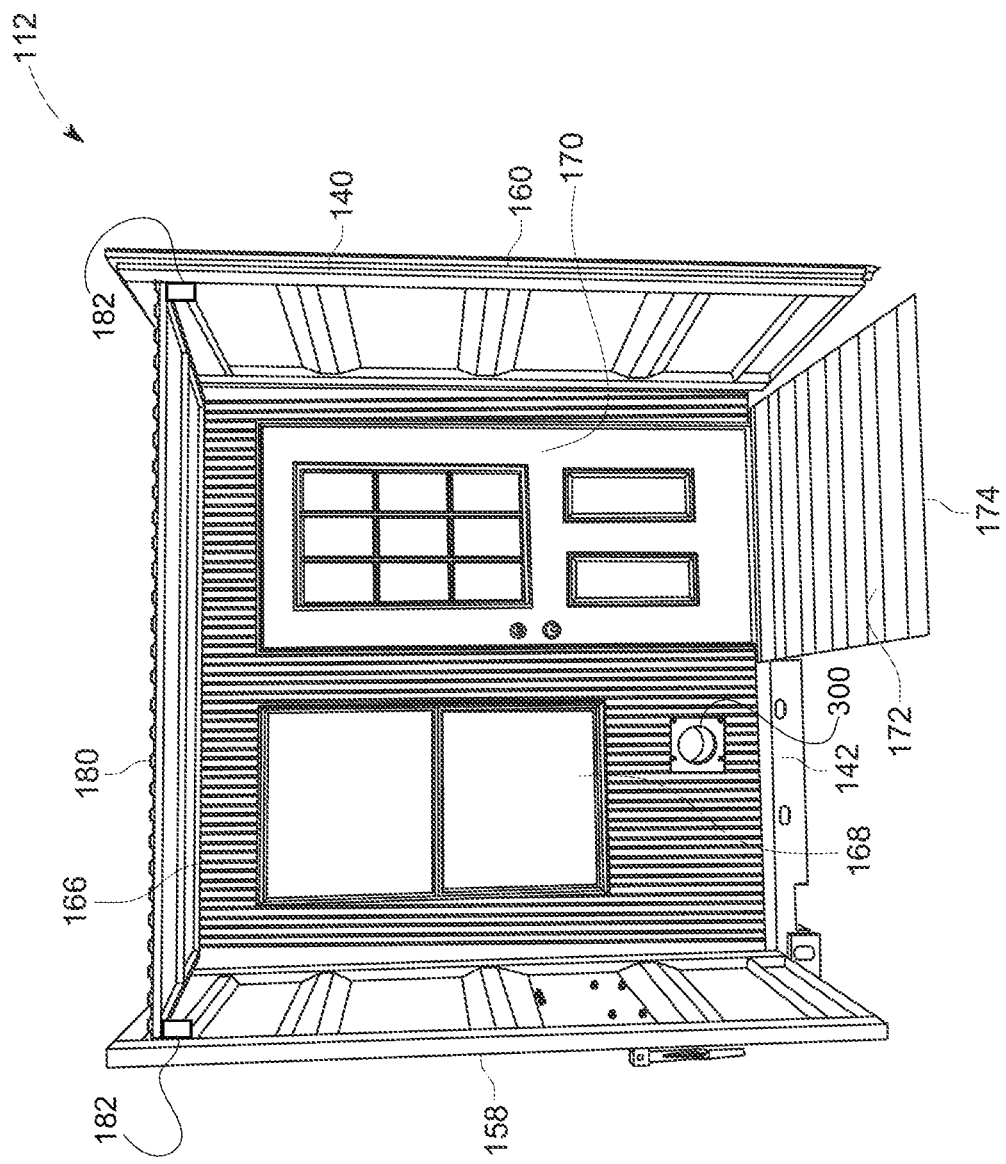
FIG. 6 is a front perspective view of the emergency housing unit of FIG. 4, depicting a canopy in an extended position and a ramp in a deployed position, in accordance with an embodiment of the disclosure.
Figure 8:
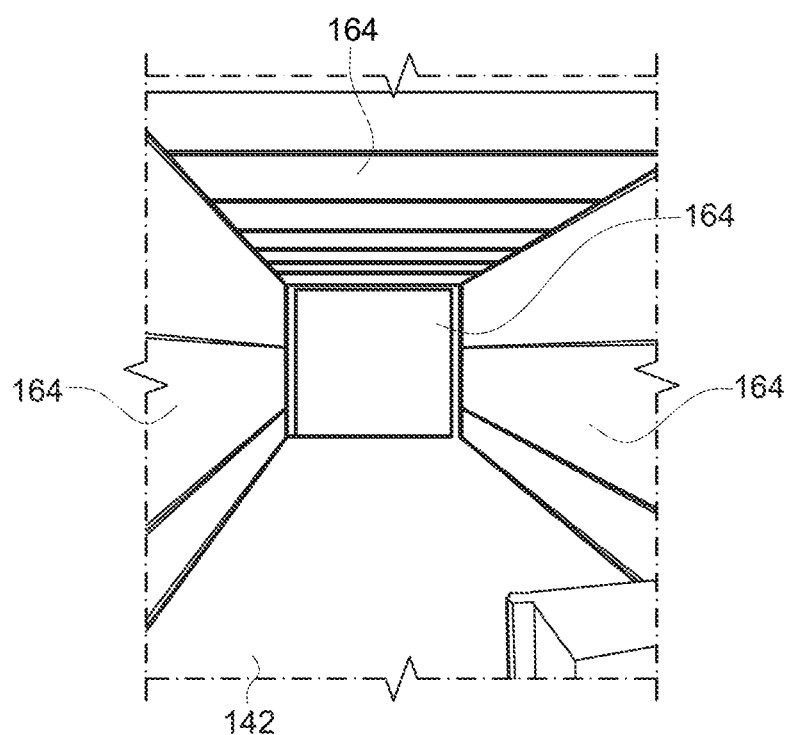
FIG. 8 is a schematic view of insulation arranged on the walls, and top of the shipping container of FIG. 5 as the shipping container is converted to the emergency housing unit of FIG. 4, in accordance with an embodiment of the disclosure.
Figure 9:
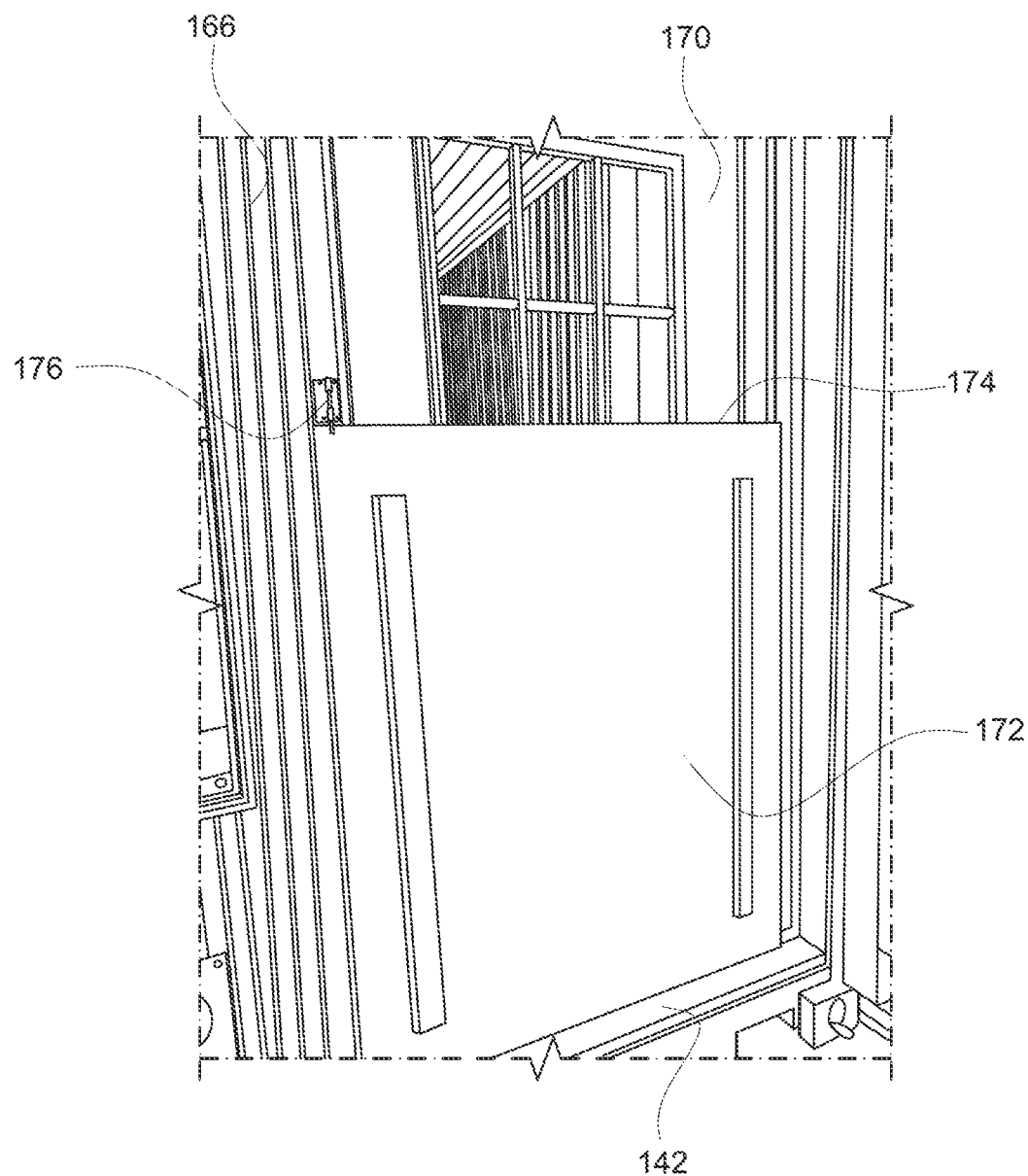
FIG. 9 is an enlarged view of the emergency housing unit of FIG. 4, with a latch holding the ramp to a front wall of the emergency housing unit in the folded position for transport, in accordance with an embodiment of the disclosure.

Further, the emergency housing unit 112 preferably includes reinforcement bars 162 (as shown in FIG. 5), such as 1"×1" steel tubing welded to the top wall 144, first sidewall 146, second sidewall 148, and rear wall 150. The emergency housing unit 112 preferably includes sound and/or thermal insulation 164 (shown in FIG. 8) laid along the top wall 144, the rear wall 150, the front wall 166, and the sidewalls 146, 148 to provide strength and insulation respectively, such as 1" foam insulation in the sidewalls 146, 148, rear wall 150, front wall 166, the top wall 144, but not the base. In further embodiments, the base 142 also includes sound and/or thermal insulation 164. In some embodiments, the sound and/or thermal insulation is not present on one or more or all of the surfaces 142, 144, 146, 148, 150. In some embodiments, 1" foil wrapped insulation may be used in one or more of the surfaces in addition to or in place of the foam insulation. In this manner, the top wall 144, the base 142, the rear wall 150, and two sidewalls 146, 148 respectively define a roof, a floor, a rear wall, and the two sidewalls of the emergency housing unit 112. As shown in FIGS. 4 and 6, the emergency housing unit 112 includes the front wall 166 covering the access opening 152. The front wall 166 may include a window 168 to provide a view of outside of the emergency housing unit 112 from an inside of the emergency housing unit 112, and a door 170 that provide access of the interior of emergency housing unit 112. Further, the emergency housing unit 112 preferably includes a ramp 172, for example, a wheel-chair ramp, pivotally coupled to the base 142 of the shipping container 140 and adapted to move between a deployed position (shown in FIGS. 4 and 6) and a folded position (shown in FIGS. 7 and 9). In the deployed position, a free end 174 of the ramp 172 contacts a ground surface and is arranged at an inclination relative to the ground surface. The ramp 172 facilitates an entry of a person on a wheelchair inside the emergency housing unit 112 and an exit of the person from the emergency housing unit 112. In the folded position, the ramp 172 is arranged covering a portion of the door 170 and is arranged substantially parallel to the front wall 166. To lock the ramp 172 in the folded position, especially during storage and transport, and to prevent the ramp from falling on the user when the gates 158, 160 are opened, a ramp latch 176 (shown in FIG. 9) may be utilized.

Figure 7:
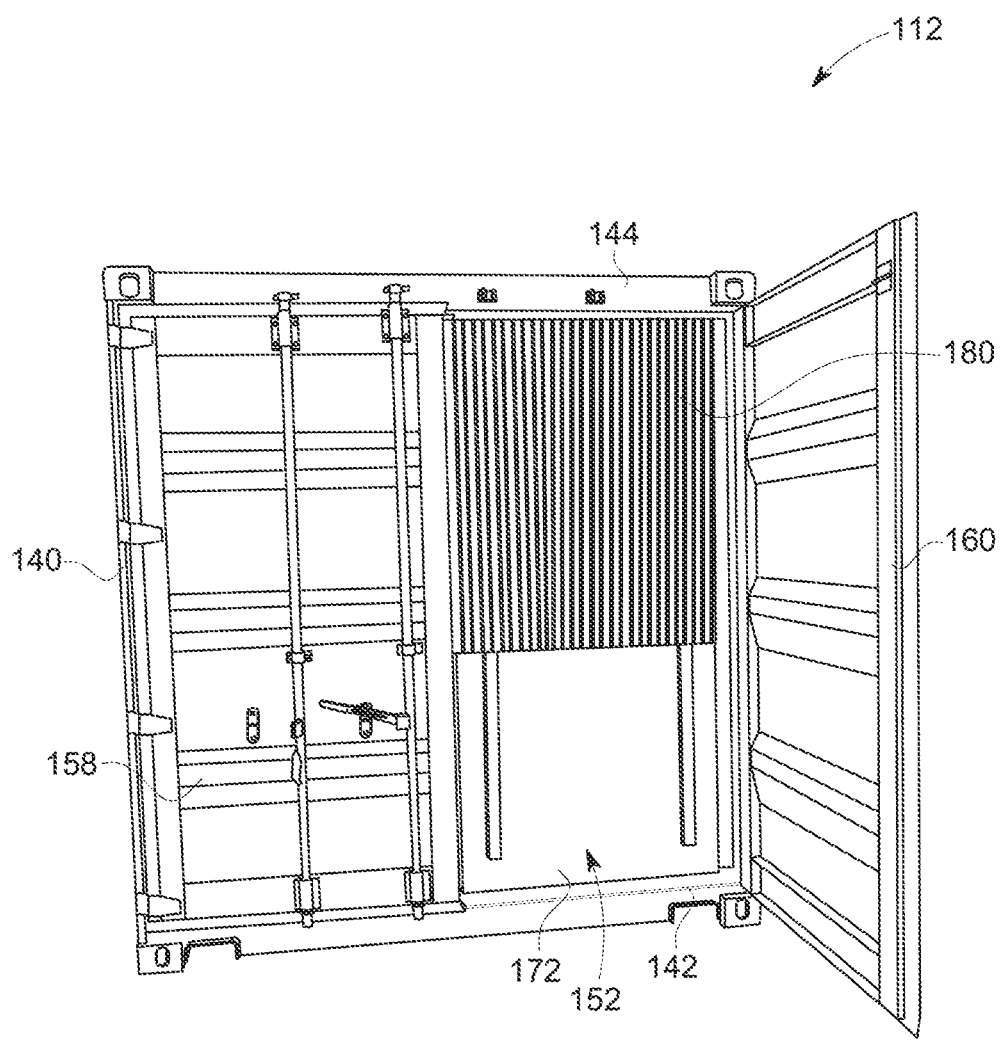
FIG. 7 is a front perspective view of the emergency housing unit of FIG. 4 depicting the canopy in a retracted position and the ramp in a folded position, in accordance with an embodiment of the disclosure.
Figure 10:
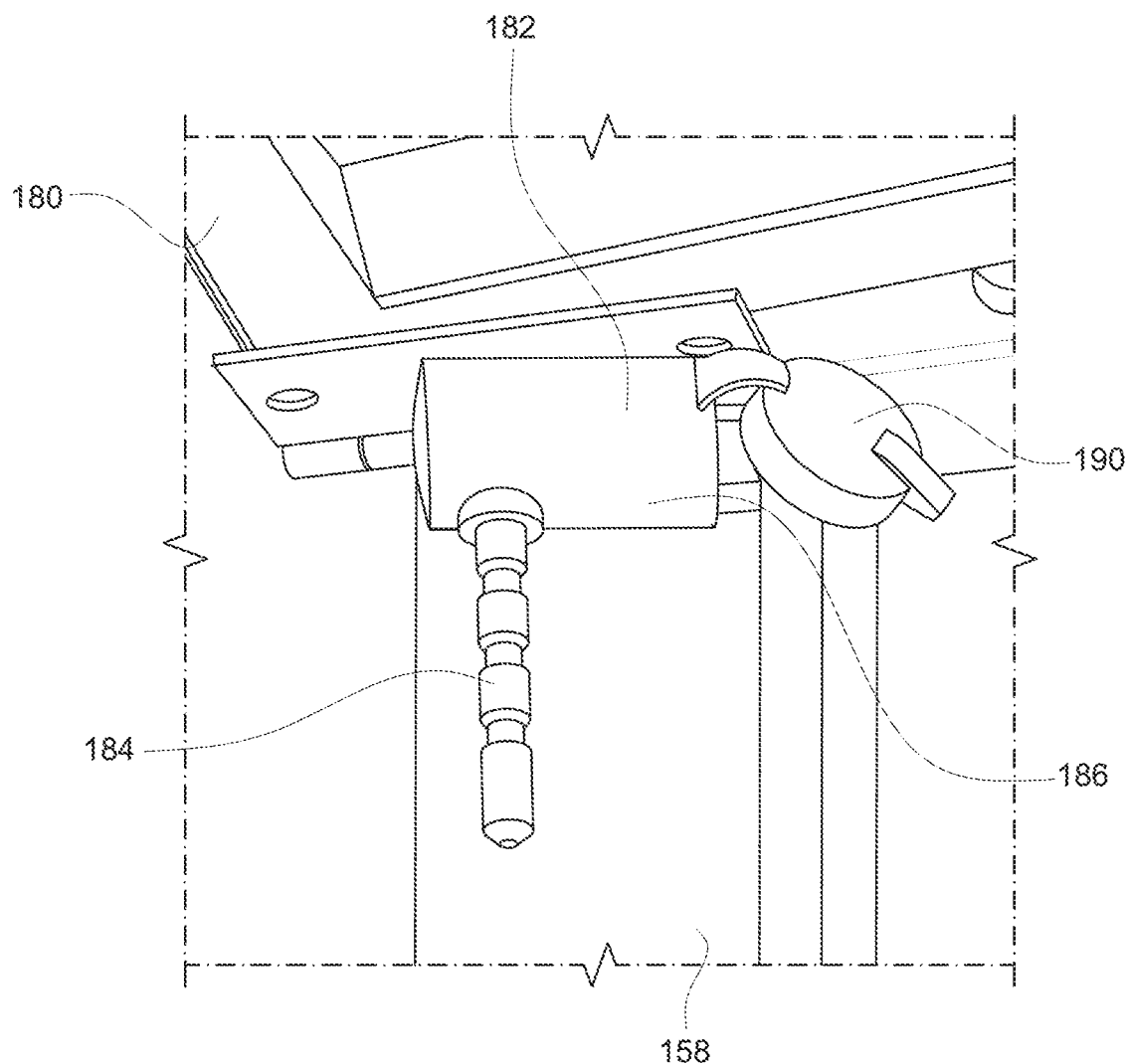
FIG. 10 is an enlarged view of the emergency housing unit of FIG. 4 showing a latch and a lock engaging and locking the canopy with the first gate, in accordance with an embodiment of the disclosure.

Further, the emergency housing unit 112 includes a canopy 180 pivotally attached to a top end of the front wall 166 or the top wall 144 and adapted to be displaced to an extended position (shown in FIGS. 4 and 6) and a retracted position (shown in FIG. 7). In the extended position, the canopy 180 extends outwardly of the front wall 166 in a direction away from the front wall 166 but at a slight downward slope to allow rain to drain. In the retracted position, the canopy 180 is arranged substantially parallel to the front wall 166 and hangs downwardly of the top end of the front wall 166. As shown in FIGS. 4 and 6, in the extended position, the canopy 180 is supported on a rear portion by a pivot connection to the front wall or top wall, and on a front portion by the top end of the pair of gates 158, 160. According to an embodiment, the emergency housing unit 112 includes a canopy latch 182 (shown in FIG. 10) for facilitating an engagement/coupling of the canopy 180 with either or preferably both of the gates 158, 160, for example, the first gate 158. In an embodiment, the latch 182 may include an extension structure 184, for example, a lever, connected with the canopy 180 and adapted to slide relative to the canopy 180, and a bracket 186, for example, a catch, connected with the first gate 158 and adapted to receive or engage with the extension structure 184 to retain the canopy 180 with the first gate 158. In an embodiment, a lock 190 may be engaged with the latch 182 so as to retain the extension structure 184 engaged with the bracket 186, lockably retaining the canopy 180 in a fixed position with respect to the first gate 158, and prevent any unauthorized displacement of the canopy 180 to the retracted position and the closing of the gates 158, 160. This feature combines the comfort of an exterior shelter from the wind and rain at the doorstep of the emergency housing unit 112, with the safety of preventing the gates 158, 160 from being inadvertently or maliciously closed while there are individuals inside the emergency housing unit 112. The extension structure 184 and lock 190 may be on either or preferably both of the gates 158, 160.

Figure 11:
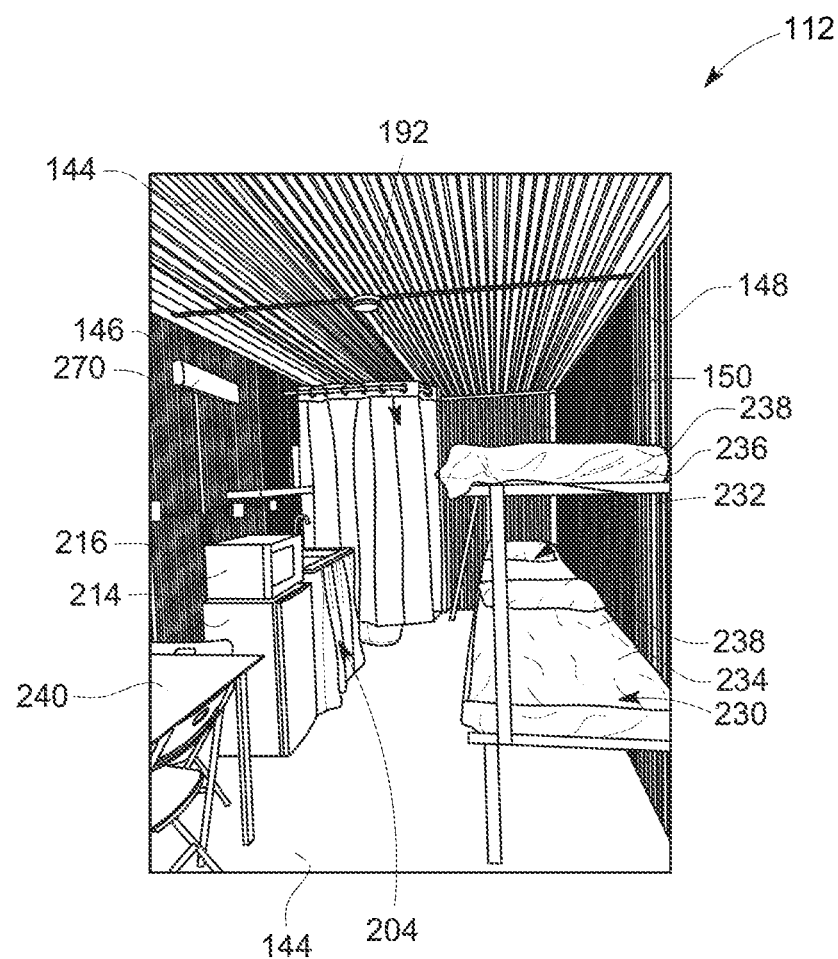
FIG. 11 is a view of an interior of the emergency housing unit of FIG. 4, in accordance with an embodiment of the disclosure.
Figure 12:
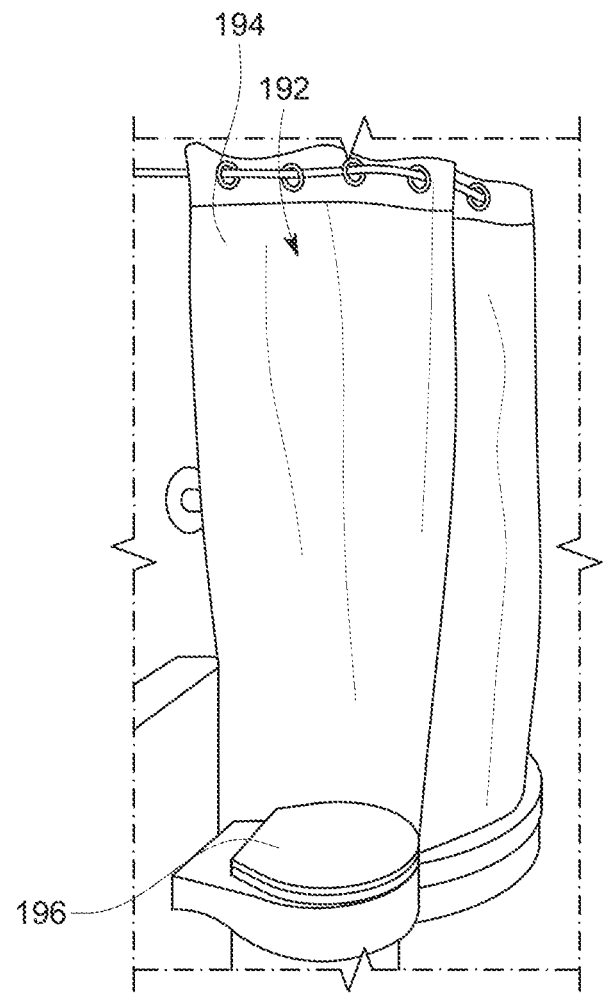
FIG. 12 is an enlarged view of a washroom area of the emergency housing unit of FIG. 4, in accordance with an embodiment of the disclosure.
Figure 13:
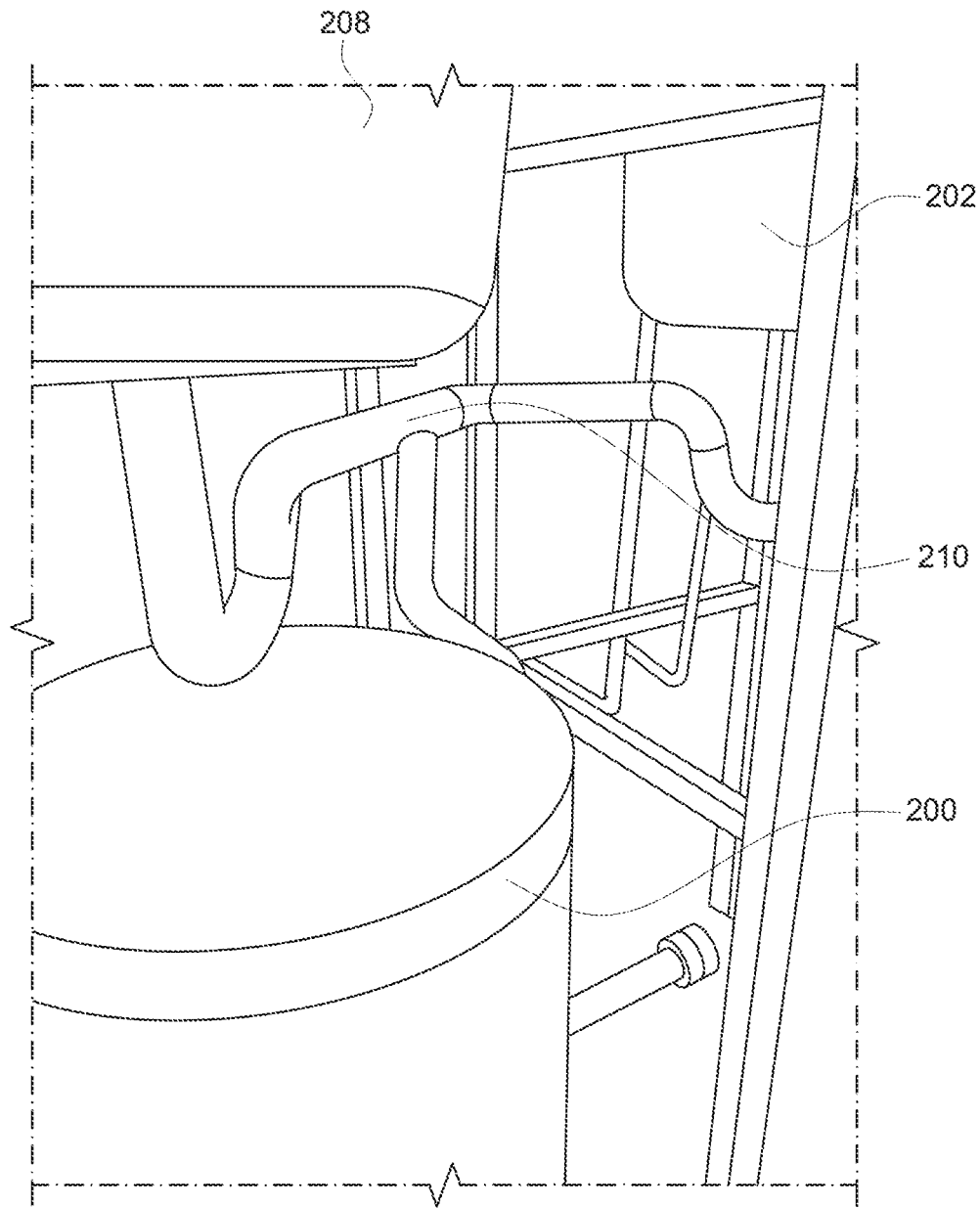
FIG. 13 is an enlarged view of a hot water tank and sink plumbing of the emergency housing unit of FIG. 4, in accordance with an embodiment of the disclosure.

Referring to FIG. 11, the emergency housing unit 112 includes a washroom area 192 proximate to the rear wall 150, and which is preferably enclosable by a movable privacy screen, such as a first curtain. The washroom area preferably includes a shower area 194, a toilet 196, and wash sink 202. The shower area 194 (shown in FIG. 12) has a shower arranged proximate to the roof or the top wall 144, supported by the first sidewall 146, and including a movable water retainer such as a glass, metal, or plastic door or a shower curtain. The toilet 196 is arranged proximate to the floor or the base 142 of the emergency housing unit 112 and disposed adjacent to the shower area 194. The toilet preferably has a lid made of plastic or other material resistant to brakeage during transport and use. In an embodiment, a macerator 198 is mounted between the toilet 196 and the first sidewall 146. A waste from a bowl of the toilet 196 is discharged preferably directly to the macerator 198 (shown in FIG. 14). through a waste pipe conduit 210. Further, the macerator 198, which can also function as a discharge tank, is adapted to grind or cut the received waste into smaller pieces and converts the waste into slurry. In an embodiment, the macerator 198 may also receive the drainage from the shower area 194. Further, washroom area 192 may include a wash-sink 202 (shown in FIG. 13) adjacent to the toilet 196 and with a macerator 198 located proximate to and preferably behind the toilet 196. Accordingly, a discharge from the toilet 196 preferably flows directly to the macerator 198. A benefit of directing the waste water through the macerator 198, is that it allows the primary drainage conduit 136 secondary drainage conduits to be relatively small diametered, such as 1 inch in diameter. This would allow standard 1 inch garden hoses to be used as the primary and secondary drainage conduits.

Figure 14:
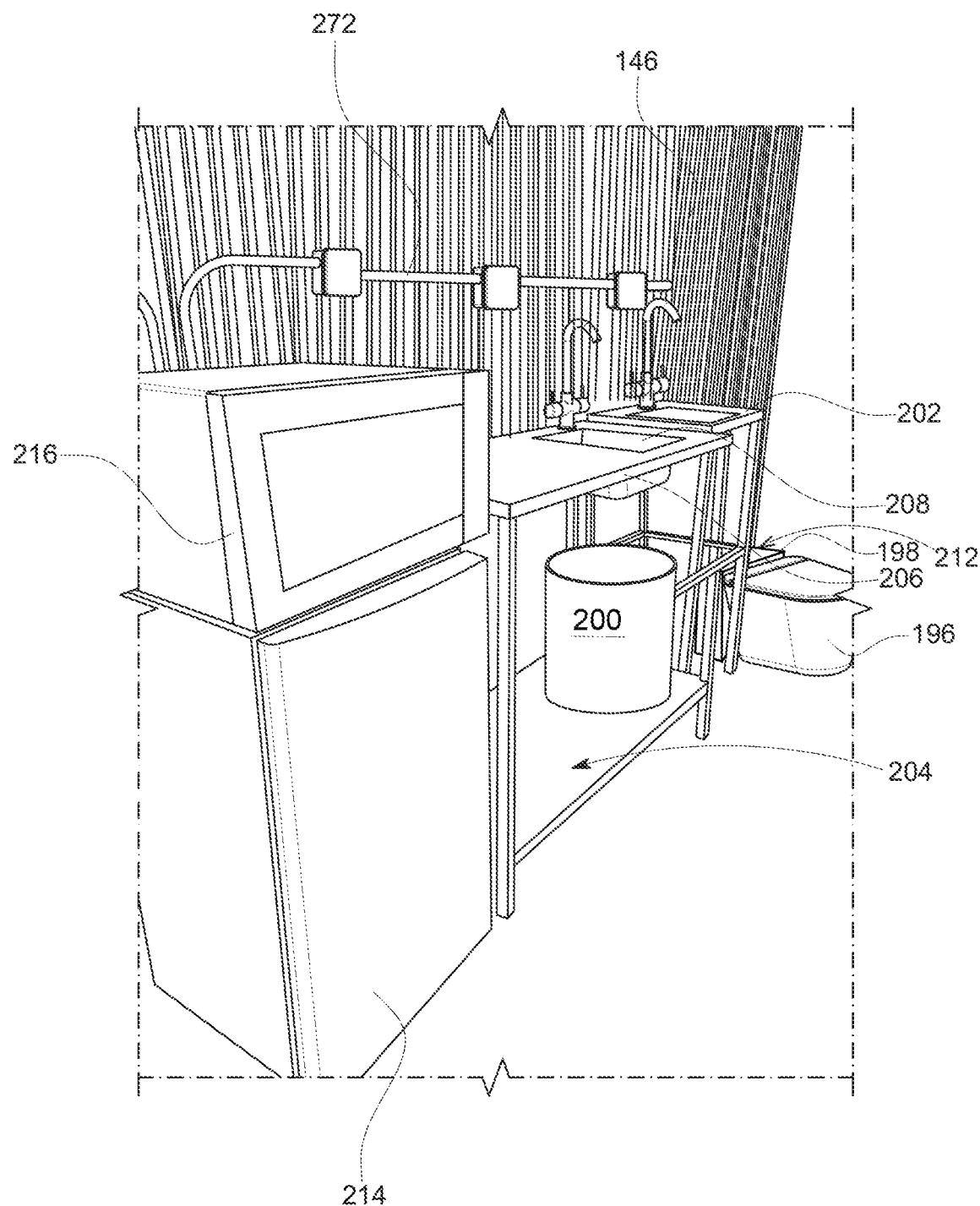
FIG. 14 is an enlarged view of a kitchen area of the emergency housing unit of FIG. 4, in accordance with an embodiment of the disclosure.

Referring to FIG. 11 and FIG. 14, adjacent to the toilet 196 and hence the washroom area 192, the emergency housing unit 112 includes a kitchen area 204 having a counter-top 206 and a kitchen sink 208. It may be envisioned that the kitchen-sink 208 is arranged proximate to the counter-top 206, and is fluidly connected to the macerator 198 via a conduit 210. The conduit 210 facilitates flow of the kitchen waste to the macerator 198 from the kitchen-sink 208. Accordingly, the macerator 198 receives discharge from the toilet 196, the wash-sink 202, the kitchen-sink 208 and the shower area 194, and grinds the solid waste into smaller pieces and may form a slurry, which may be stored inside the macerator until a specified volume is exceeded, and then pumped out of the emergency housing unit 112, through a check valve 199 to prevent reverse flow of waste, and to the auxiliary drainage conduit 137. To enable the flow of the waste from the macerator 198 to the auxiliary drainage conduit, the macerator 198 may include a pump 212 (indicated in FIG. 14) to push out the waste from the macerator 198. There is preferably a float switch inside the macerator that starts the pump 212 when the specified volume of waste is exceeded. As the solid waste is converted into smaller pieces or slurry, a relatively small diameter outlet conduit, for example, having a one inch diameter, may be utilized. The kitchen area 204 further preferably includes a refrigerator 214 and a microwave oven 216 arranged on the side of the counter-top 206. The primary drainage conduit is preferably arranged at a height to allow gravity feed of waist from the one or more units 112 to a storage or discharge.

In a further embodiment, the stainless-steel counter-top 206 may be extended and the refrigerator 214 mounted under it. Such a change could help facilitate securing housing units 112 and preventing movement. In such an embodiment, the microwave oven 216 could be mounted on top of the counter-top 206 above the refrigerator 214, further facilitating securing housing units 112 and preventing movement.

Figure 15:
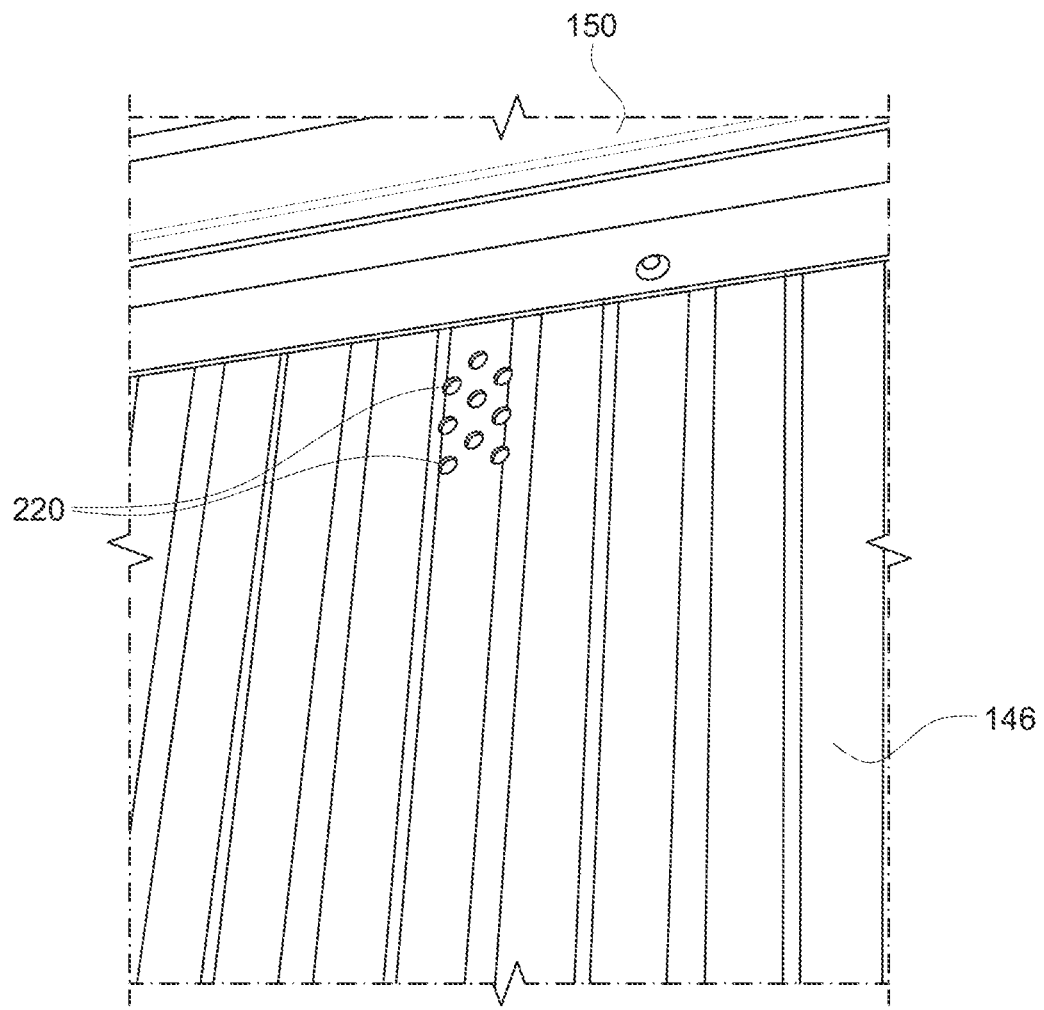
FIG. 15 is an enlarged view the first sidewall of the emergency housing unit of FIG. 4, depicting ventilation openings, in accordance with an embodiment of the disclosure.

Further, as shown in FIG. 15, one of the sidewalls, the rear wall, and/or the front wall beneath the canopy, may define at least one ventilation opening 220 extending through a thickness in the wall. In a preferred embodiment, as shown in FIG. 15, the ventilation opening 220 will be include a set of multiple through holes in a single location. In the embodiment shown in FIG. 15, together the nine through holes, each measuring between 0.25 inches and 2 inches in diameter, form a single ventilation opening 220. The number of through holes may vary, from 1 to 15, for example, and the size of the holes may vary. In a preferred embodiment there will be multiple such ventilation openings positioned around the perimeter of the emergency housing unit 112, such as 2, 3, 4, or 5 separate ventilation opening 220. In a preferred embodiment, a majority of the ventilation openings will be positioned adjacent an opposite end of the emergency housing unit 112 as the air conditioner exhaust vent 300. The ventilation openings 220 facilitate a circulation of air inside the emergency housing unit 112, may have a mesh or filter covering the opening to allow air to pass but prevent pests from entering the inside of the emergency housing unit 112. The ventilation openings may also have a rain shield extending from the wall adjacent to and above the ventilation opening, and preferably pivotably attached to the wall so that the rain shield may be in a recessed folded down position in storage and transport. Also, referring back to FIG. 11, the emergency housing unit 112 may include at least one pair of bunk beds, for example a first bunk bed 230, and a second bunk bed 232, extending along a length of the second sidewall 148 and may be mounted to the second sidewall 148. In a preferred embodiment a second pair of bunk beds is mounted to the second sidewall adjacent to the first pair of bunk beds to allow for four beds on the second side wall. In a bunk bed pair, the bunk beds 230, 232 include a lower deck 234 and an upper deck 236, each preferably movable between a first position and a second position. In the first position, the deck 234, 236 is arranged substantially parallel to the floor or the base 142 and facilitates a sleeping of a person. In the second position, the deck 234, 236 pivots downward and is arranged substantially parallel to the second sidewall 148. Accordingly, the lower deck 234 and the upper deck 236 may be converted into a couch by moving the upper deck 236 to the second position. For greater space, the lower deck 234 and the upper deck 236 may both be moved into the second position to provide space to move about inside the emergency housing unit 112. Further, each of the bunk beds 230, 232 preferably includes soy-based mattress 238 for improved fire rating compared to traditional mattresses, though non-soy based and traditional mattresses are conceived in some embodiments.

Figure 16:
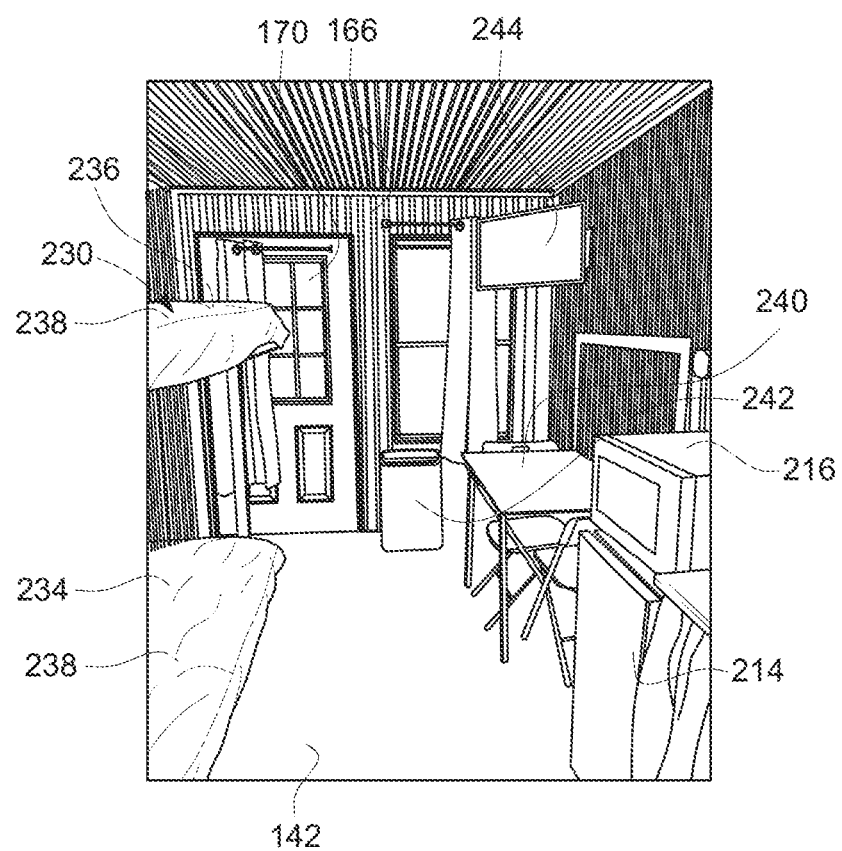
FIG. 16 is an enlarged view of a front, entrance portion of the emergency housing unit of FIG. 4 viewed from the inside, depicting a table and an air conditioner, in accordance with an embodiment of the disclosure.

Additionally, as shown in FIG. 16, the emergency housing unit 112 includes a table 240 arranged proximate to the front wall 166 of the emergency housing unit 112, and pivotally connected to the first sidewall 146 of the emergency housing unit 112. The table 240 is adapted to pivot between a deployed position and a folded position. In the deployed position, a work board of the table 240 is arranged substantially parallel to the floor or the base 142 to facilitate a use of the table 240 by the person. While in the folded position, the work board is arranged substantially parallel to the first sidewall 146, thereby allows extra space for an additional bed space. Moreover, the emergency housing unit 112 preferably includes a portable air-conditioner 242 and/or a television 244.

Figure 17:
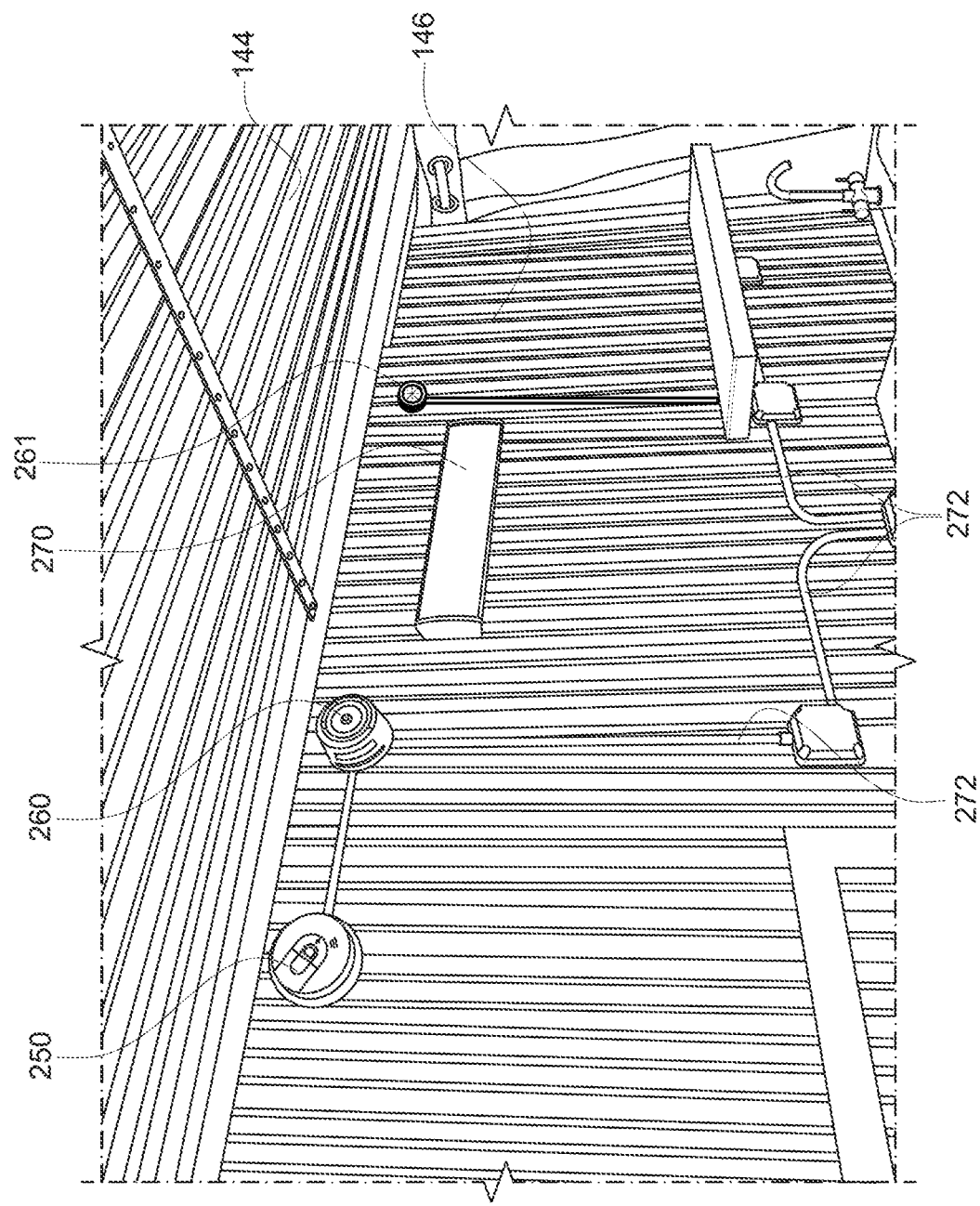
FIG. 17 is an enlarged view of a portion of the emergency housing unit of FIG. 4, depicting a sensor and a sprayer, in accordance with an embodiment of the disclosure.

Further, as shown in FIG. 17, the emergency housing unit 112 includes a sensor 250, for example, a heat sensor, a fire sensor and/or a smoke sensor, mounted on a sidewall, for example, the first sidewall 146, to detect a presence of a fire or a smoke inside the emergency housing unit 112. The sensor 250 is preferably communicatively coupled to an ADA alert alarm 260. The ADA alert alarm in this embodiment may be a flashing light for hearing impaired alone and/or may also include a loud auditory alarm. Also shown is fire suppression sprayer 261 adapted to spray a fire retardant upon detecting heat or smoke inside the emergency housing unit 112. In an embodiment, the fire retardant is water, the sprayer 261 is a heat sensitive sprayer 261 triggered automatically by excess heat, and sprays pressurized water from the pressurized water supply. In further embodiments, the sprayer 261 may also be actuated by the triggering of the sensor 250, such as when a detected level of smoke inside the emergency housing unit 112 is above a threshold value. As shown, the sprayer 260 is mounted on the first sidewall 146 at a location proximate to the ceiling or the top wall 144 of the emergency housing unit 112, preferably one to five inches down from the ceiling, and preferably slightly to the right of the proximate lightening unit 270, by one two inches, for example. The emergency housing unit 112 includes one or more lightening units 270 to provide adequate light in the washroom area, the kitchen area, etc. In an embodiment, the lightening units 270 may be LED's (light emitting diodes) to reduces electricity consumption and heat generation. Also, the emergency housing unit 112 may include a polished stainless-steel mirror, to prevent corrosion during storage and breakage during transport. Moreover, the exterior of the emergency housing unit may be painted with Kool Coat paint to reduce air conditioning load. Further, emergency housing unit includes a plurality of conduits 272, mounted on the sidewalls, through electric wires extends. Further, the emergency housing unit 112 includes ground fault circuit interrupter to protect from electric faults.

Figure 18:
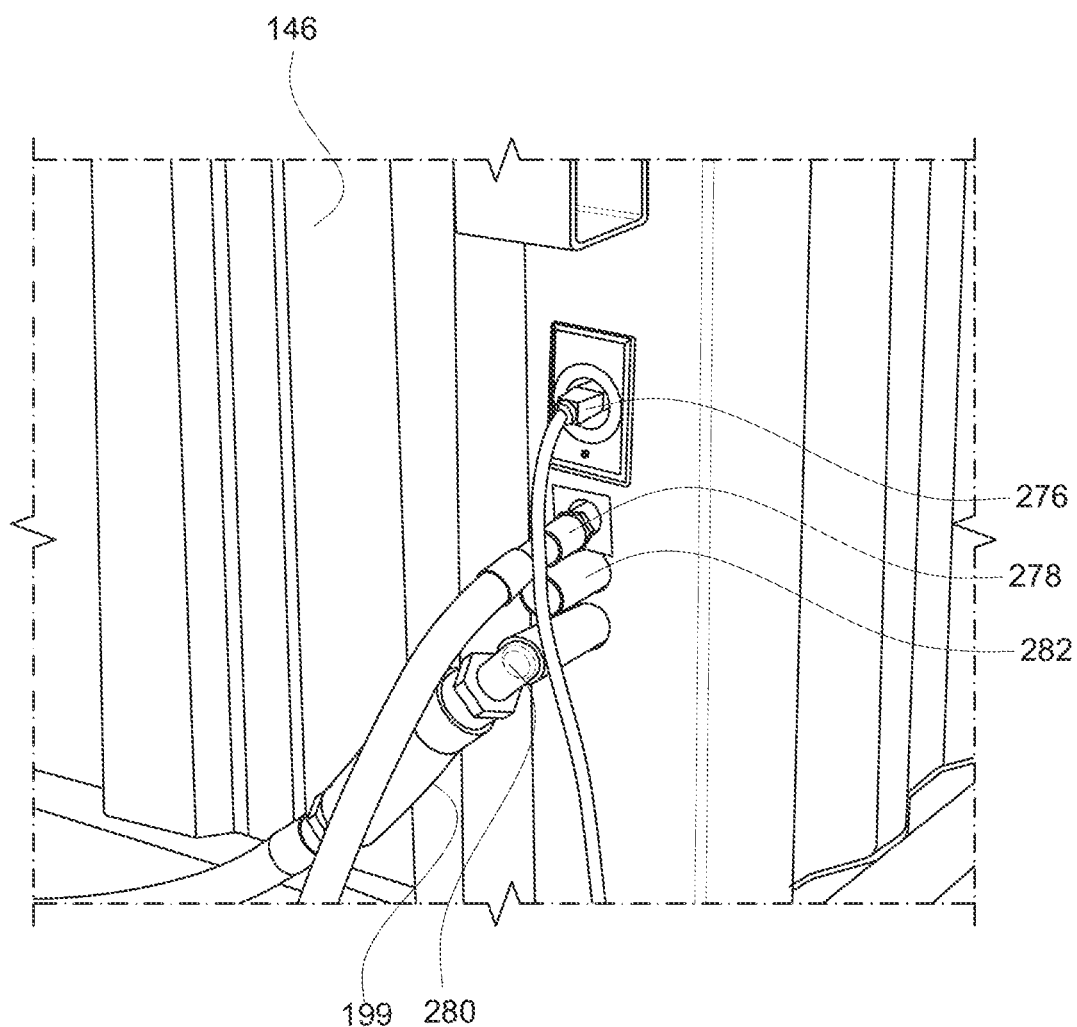
FIG. 18 is an enlarged view of a connection of the various utilities of the emergency housing unit of FIG. 4, in accordance with an embodiment of the disclosure.

Referring to FIG. 18, the emergency housing unit may define a plurality of through hole conduits, for example, a first hole, a second hole, a third hole, and a fourth hole, facilitating a passage of various conduit between the inside and the outside the emergency housing unit 112. For example, the first hole facilitates an entry of an electric feed 276 inside the emergency housing unit 112, the second hole facilitates an entry of water feed 278 inside the emergency housing unit, the third hole facilitates an exist of septic discharge 280 from the emergency housing unit 112, and the fourth hole defines a septic vent 282. In an embodiment, the holes included are substantially one inch in diameter. In a further embodiment, the septic vent 282 may be between 1.0 inches in diameter and 3.0 inches in diameter and located at the top of the four holes. The holes are located adjacent to one another, allowing quick hookup of various conduits at the same time, which can mean life or death in emergency situations.

A method for establishing the housing settlement 100 is now described. For setting the housing settlement, a plurality of emergency housing units 112 is moved from a storage location to an area where the housing settlement 100 is to be established. It may be appreciated that the emergency housing units 112 are stacked 2, 3, 4, 5, 8, or 10 units high and stored at the storage location in a closed position. In the closed position, the ramp 172 and the canopy 180 of each emergency housing unit 112 are respectively arranged in folded position and the retracted position (as shown in FIG. 7). Also, in the close position, the gates 158, 160 are locked in the first position such that that the ramp 172 and the canopy 180 are arranged between the front wall 166 and the gates 158, 160.

For establishing the housing settlement 100, each emergency housing unit 112 is moved to the area where the housing settlement 100 is to be established. It may be appreciated that each emergency housing unit 112 is transported to the designated area in the closed position. At the designated area, the emergency housing units 112 are arranged in the plurality of housing colonies, for example, the first housing colony 102 and the second housing colony 104. Within each of the housing colonies 102, 104, the emergency housing units 112 are arranged in the pair of rows 114, 116. For example, as shown in FIG. 1 and FIG. 2, the first row emergency housing units 112a are arranged in the first row 114 and the second row emergency housing units 112b are arranged in the second row 116 such that the rears of the first row emergency housing units 112a face the rears of the second row emergency housing units 112b.

After arranging the emergency housing units 112 in the plurality of housing colonies 102, 104, each emergency housing unit 112 is moved to an open position. For so doing, the gates 158, 160 of the associated emergency housing unit 112 are moved to the second position, and the ramp 172 is arranged at the deployed position. Further, the canopy 180 is moved to the extended position and engaged with the first gate 158 and the second gate 160 by engaging the extension structures 184 with the brackets 186. Further, the extension structures 184 are locked within the brackets 186 by using the locks 190.

After moving each emergency housing unit 112 to the open position, the water feed 278 of each emergency housing unit 112 is connected with the main pipe 130 via the auxiliary pipe 134, and the main pipe 130 is connected with the water reservoir 106. Similarly, the septic discharge 280 of each emergency housing unit 112 is connected with the primary drainage conduit 136 via the associated secondary drainage conduit 137, and the primary drainage conduit 136 is connected with the drainage tank 108. Additionally, the power lines 138 from the electric generator 110 are connected with the electric feed 276 of each emergency housing unit 112. In this manner, a temporary housing settlement 100 can be established quickly and efficiently.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

Wherefore, We claim:

1. An emergency housing unit comprising:
a shipping container having a base, a top wall, first side wall, a second side wall, a rear wall, and a first gate and a second gate along a front side opposite the rear wall;
a front wall disposed at the front side having a door;
a canopy pivotally connected to the front wall at a location adjacent to both a top portion of the shipping container and the front wall, the canopy able to pivot from a closed retracted position parallel with the front wall to an open extended position;
a canopy latch attached to one of the first gate and the second gate, the canopy latch engaging with the canopy and releasably lockably fixing the canopy and one or both gates in a fixed position relative to one another and releasably lockably holding the canopy in an open extended position and preventing the gates from moving into a closed position, the canopy in the extended position being between 110 degrees and 93 degrees or between 87 degrees and 70 degrees with respect to the front wall;
a ramp that is pivotally connected to one of the shipping container and the front wall at a location adjacent to both a bottom portion of the shipping container and the front wall, and is able to pivot from a folded position adjacent and parallel to the front wall, and a deployed position extending downwardly sloping from the front wall;
a ramp latch directly attached to one of the ramp and the front wall that releasably attaches the ramp in the folded position;
a toilet;
a macerator;
a first waste conduit conducting waste from the toilet to the macerator;
a shower;
a kitchen sink;
a wash sink;
a second waste conduit fluidly connecting the shower to the to the macerator;
a third waste conduit fluidly connecting the kitchen sink to the to the macerator;
a fourth waste conduit fluidly connecting the wash sink to the to the macerator;
a plurality of through hole conduits in one of the first side wall, the second side wall, the rear wall and the base;
the plurality of through hole conduits including an electric feed, a water feed, a septic discharge, and a septic vent, and each of the plurality of through hole conduits being located within 18 inches of any of any of the other plurality of through hole conduits;
electrical wiring with multiple electrical outlets to deliver electricity to the from the electric feed through emergency housing unit;
clean water piping fluidly connecting each of a kitchen sink, a wash sink, a toilet, a shower, and a sprayer to the water feed;
waste conduits fluidly connecting the one or more or all of the kitchen sink, the wash sink, a toilet, and the shower to a macerator, and then to the septic discharge;
septic vent piping fluidly connecting the macerator and the septic vent;

one or more ventilation openings defined in one of the first side wall, the second side wall, the rear wall, and the front wall at a location adjacent to the top wall;
one of a fire sensor and a smoke sensor mounted on one of the first side wall, the second side wall, the rear wall, and the front wall;
a visual and/or auditory ADA alert alarm communicatively connected to the one of the fire sensor and the smoke sensor;
the sprayer adapted to spray water when a sprayer heat sensor detects fire;
a first bed attached to one of the first wall and the second wall and a second bed pivotally attached to the one of the first wall and the second wall vertically above the first bed, the second bed releasably fixedly positionable in a first position, substantially parallel to the base, and a second position substantially orthogonal to the base;
a frame of the second bed extending from the one of the first wall and second wall in the first position substantially a same distance as the second bed is vertically above the first bed, such that when the second bed is pivoted into the second position, the first bed and the second bed form a couch;
a solid polished steel mirror attached to one of the first side wall, the back wall, and the second side wall;
a portable air-conditioner inside the house with an air conditioner vent defined in the first wall; and
a plurality of light emitting diode lights attached to an upper portion of the inside of the house.

2. The emergency housing unit of claim 1, further comprising one of a solar thermal collector and a photovoltaic array arranged on an exterior surface of one of the shipping container.

3. An emergency housing settlement comprising:
a first plurality of emergency housing units, each housing unit including
a shipping container having a base, a top wall, first side wall, a second side wall, a rear wall, and a first gate and a second gate along a front side opposite the rear wall;
a front wall disposed at the front side having a door;
a canopy pivotally connected to one of the shipping container and the front wall at a location adjacent to both a top portion of the shipping container and the front wall, the canopy able to pivot from a closed retracted position parallel with the front wall to an open extended position;
a canopy latch attached to one of the first gate and the second gate, the canopy latch engaging with the canopy and releasably lockably fixing the canopy and one or both gates in a fixed position relative to one another and releasably lockably holding the canopy in an open extended position and preventing the gates from moving into a closed position, the canopy in the extended position being between 110 degrees and 93 degrees or between 87 degrees and 70 degrees with respect to the front wall;
a ramp that is pivotally connected to the front wall at a location adjacent to both a bottom portion of the shipping container and the front wall, and is able to pivot from a folded position adjacent and parallel to the front wall, and a deployed position extending downwardly sloping from the front wall;
a ramp latch directly attached to one of the ramp and the front wall that releasably attaches the ramp in the folded position;
a toilet;
a macerator;
a first waste conduit conducting waste from the toilet to the macerator;
a shower;
a kitchen sink;
a wash sink;
a second waste conduit fluidly connecting the shower to the to the macerator;
a third waste conduit fluidly connecting the kitchen sink to the to the macerator;
a fourth waste conduit fluidly connecting the wash sink to the to the macerator;
a plurality of through hole conduits in one of the first side wall, the second side wall, the rear wall and the base;
the plurality of through hole conduits including an electric feed, a water feed, a septic discharge, and a septic vent, and each of the plurality of through hole conduits being located within 18 inches of any of any of the other plurality of through hole conduits;
electrical wiring with multiple electrical outlets to deliver electricity to the from the electric feed through emergency housing unit;
clean water piping fluidly connecting each of a kitchen sink, a wash sink, a toilet, a shower, and a sprayer to the water feed;
waste conduits fluidly connecting the one or more or all of the kitchen sink, the wash sink, a toilet, and the shower to a macerator, and then to the septic discharge;
septic vent piping fluidly connecting the macerator and the septic vent;
one or more ventilation openings defined in one of the first side wall, the second side wall, the rear wall, and the front wall at a location adjacent to the top wall;
one of a fire sensor and a smoke sensor mounted on one of the first side wall, the second side wall, the rear wall, and the front wall;
a visual and/or auditory ADA alert alarm communicatively connected to the one of the fire sensor and the smoke sensor;
the sprayer adapted to spray water when a sprayer heat sensor detects fire;
a first bed attached to one of the first wall and the second wall and a second bed pivotally attached to the one of the first wall and the second wall vertically above the first bed, the second bed releasably fixedly positionable in a first position, substantially parallel to the base, and a second position substantially orthogonal to the base;
a frame of the second bed extending from the one of the first wall and second wall in the first position substantially a same distance as the second bed is vertically above the first bed, such that when the second bed is pivoted into the second position, the first bed and the second bed form a couch;
a solid polished steel mirror attached to one of the first side wall, the back wall, and the second side wall;
a portable air-conditioner inside the house with an air conditioner vent defined in the first wall; and
a plurality of light emitting diode lights attached to an upper portion of the inside of the house,
a water source;
an electrical power source;
a drainage collection unit;
a main pipe connected to the water source and routing water toward the plurality of emergency housing units;

a power line routing electrical power from the electrical power source toward the emergency housing units; and a primary drainage conduit routing waste from the plurality of emergency housing units to the drainage collection unit.

4. The emergency housing settlement of claim 3 further comprising a first housing colony including the first plurality of emergency housing units of and a second housing colony including a second plurality of emergency housing units.

5. The emergency housing settlement of claim 4 wherein the first plurality of plurality of emergency housing units includes a first row of emergency housing units and a second row of emergency housing units, with a rear of the first row of emergency housing units faces and is spaced from a rear of the second row of emergency housing units, creating a street between the respective first and second rows.

6. The emergency housing settlement of claim 5, wherein the main pipe runs down the street at ground level, and a respective one of a plurality of auxiliary pipes connects each emergency housing unit to the main pipe.

7. The emergency housing settlement of claim 5, wherein the primary drainage conduit runs down the street at an elevation above a height of one or more or all of a plurality of auxiliary drainage conduits, and a respective one of the plurality of auxiliary drainage conduits connects each emergency housing unit to the primary drainage conduit.

* * * * *